(12) United States Patent
Letsky

(10) Patent No.: US 10,113,280 B2
(45) Date of Patent: Oct. 30, 2018

(54) AUTONOMOUS ROBOT APPARATUS AND METHOD FOR CONTROLLING THE SAME

(71) Applicant: Michael Todd Letsky, Boca Raton, FL (US)

(72) Inventor: Michael Todd Letsky, Boca Raton, FL (US)

(73) Assignee: Michael Todd Letsky, Boca Raton, FL (US)

( * ) Notice: Subject to any disclaimer, the term of this patent is extended or adjusted under 35 U.S.C. 154(b) by 208 days.

(21) Appl. No.: 14/139,218

(22) Filed: Dec. 23, 2013

(65) Prior Publication Data
US 2014/0180478 A1    Jun. 26, 2014

Related U.S. Application Data

(60) Provisional application No. 61/745,074, filed on Dec. 21, 2012.

(51) Int. Cl.
*G05B 15/00* (2006.01)
*G05B 19/00* (2006.01)
(Continued)

(52) U.S. Cl.
CPC ............. *E01H 5/00* (2013.01); *E01H 5/098* (2013.01); *G05D 1/0231* (2013.01); *G05D 1/0278* (2013.01); *G05D 2201/0203* (2013.01)

(58) Field of Classification Search
CPC ......... B25J 9/16; B25J 9/1694; G05D 1/0027; G05D 1/0088; G05D 1/0212;
(Continued)

(56) References Cited

U.S. PATENT DOCUMENTS 6,339,735 B1 * 1/2002 Peless et al. .............. 701/23
D643,048 S     8/2011 Pflum
(Continued)

FOREIGN PATENT DOCUMENTS

CN     201908275 U  *  7/2011
CN     202124816 U  *  1/2012
(Continued)

OTHER PUBLICATIONS

Suzuki et al. "Experimental study on practical automatic snowplows" ICCAS2001.*
(Continued)

*Primary Examiner* — Rachid Bendidi

(57) ABSTRACT

An autonomous robot apparatus that is activated to perform a work routine upon detecting the accumulation of precipitation. In one aspect, the invention can be an autonomous robot apparatus comprising: a chassis; a plurality of wheels mounted to the chassis; a drive system mounted to the chassis and operably coupled to the plurality of wheels; a control module operably coupled to the drive system; a precipitation sensing module comprising an accumulation level sensor configured to generate and transmit, to the control module, a first signal upon a predetermined initial accumulation level being detected; and the control module configured to activate the autonomous robot apparatus to perform a first instance of a work routine upon receipt of the first signal.

17 Claims, 13 Drawing Sheets

(51) Int. Cl.
*E01H 5/00* (2006.01)
*G05D 1/02* (2006.01)
*E01H 5/09* (2006.01)

(58) Field of Classification Search
CPC .. G05D 1/0214; G05D 1/0219; G05D 1/0223; G05D 1/0234; G05D 1/0242; G05D 1/0246; G05D 1/0225; G05D 1/0251; G05D 1/0272; G05D 1/0274; G05D 1/0231; G05D 1/0278; G05D 2201/0203; A01D 34/008; E01H 5/00
USPC .................................................. 700/245–264
See application file for complete search history.

(56) References Cited

U.S. PATENT DOCUMENTS

| | | | |
|---|---|---|---|
| 2001/0047231 A1* | 11/2001 | Peless et al. ..................... 701/23 |
| 2006/0020369 A1* | 1/2006 | Taylor ..................... A47L 9/009 |
| | | | 700/245 |
| 2007/0234492 A1* | 10/2007 | Svendsen et al. ............. 15/21.1 |
| 2010/0037418 A1* | 2/2010 | Hussey et al. ................. 15/319 |
| 2010/0082193 A1* | 4/2010 | Chiappetta ...................... 701/24 |
| 2010/0106344 A1* | 4/2010 | Edwards et al. ................. 701/2 |
| 2010/0326363 A1* | 12/2010 | Van Den Berg ........... 119/57.92 |
| 2011/0153338 A1* | 6/2011 | Anderson ..................... 705/1.1 |
| 2011/0166715 A1* | 7/2011 | Hoffman et al. ............. 700/284 |
| 2011/0219868 A1* | 9/2011 | Lane .......................... 73/170.21 |
| 2012/0222224 A1* | 9/2012 | Yoon ....................... A47L 11/33 |
| | | | 15/52.1 |

FOREIGN PATENT DOCUMENTS

| | | |
|---|---|---|
| JP | 2003013418 A * | 1/2003 |
| JP | 2003013418 A | 1/2003 |
| WO | 2010114623 | 10/2010 |

OTHER PUBLICATIONS

English translation for reference JP2003013418A.*
English translation for reference CN201908275.*
Lin, "English Translation for reference CN202124816U", Jan. 2012.*
"Inventors create and automated snowplow that makes snow bricks", www.geek.com/news/inventors-create-an-automated-snowplow-that-makes-snow-bricks-1093021/, Dec. 9, 2013, p. 1.
"The world's Smartest Snow Shovel", www.i-shovel.com/howitworks.html, Dec. 9, 2013, pp. 1-2.

* cited by examiner

AUTONOMOUS ROBOT APPARATUS AND METHOD FOR CONTROLLING THE SAME

CROSS-REFERENCE TO RELATED APPLICATION

The present application claims the benefit of U.S. Provisional Patent Application Ser. No. 61/745,074, filed Dec. 21, 2012, the entirety of which is hereby incorporated by reference.

FIELD OF THE INVENTION

This invention relates to the field of autonomous robots and, specifically to autonomous robots that are designed to perform tasks within a desired area.

BACKGROUND OF THE INVENTION

Autonomous robots that perform household functions such as floor cleaning and lawn mowing are now readily available consumer products. As found in the industry and elsewhere, few attempts have been made to build snow clearing robots. Each of these robots has faced a similar challenge that is yet unresolved: how to remove snow with minimal effort and efficiently cover the designated area given limited energy reserves. When dealing with a snow covered area, existing snow clearing is not achieved autonomously and only removes snow after the snowfall has terminated. Examples of existing snow removal systems include snow plows, snow blowers, and snow melting. When all aspects of the snow clearing system are operating properly, these systems perform their respective tasks with a human operator.

Thus, a need exists for an autonomous robot that can clear snow autonomously, as snow falls, and safely.

SUMMARY OF THE INVENTION

The present invention is directed to an autonomous robot apparatus and method of controlling the same. The autonomous robot apparatus performs a snow clearing task within a designated area. The autonomous robot apparatus may be able to detect the accumulation of precipitation and to activate for a work session automatically upon such detection.

In one aspect, the invention can be an autonomous robot apparatus comprising: a chassis; a plurality of wheels mounted to the chassis; a drive system mounted to the chassis and operably coupled to the plurality of wheels; a control module operably coupled to the drive system; a precipitation sensing module comprising an accumulation level sensor configured to generate and transmit, to the control module, a first signal upon a predetermined initial accumulation level being detected; and the control module configured to activate the autonomous robot apparatus to perform a first instance of a work routine upon receipt of the first signal.

In another aspect, the invention can be a method of controlling an autonomous robot comprising a chassis, a plurality of wheels mounted to the chassis, a drive system mounted to the chassis and operably coupled to the plurality of wheels, a control module operably coupled to the drive system, the method comprising: a) detecting, with an accumulation level sensor, precipitation accumulation levels; b) upon a predetermined initial accumulation level being detected by the accumulation level sensor, generating and transmitting to the control module a first signal; and c) upon the control module receiving the first signal, activating the autonomous robot to perform a first instance of a work routine.

DETAILED DESCRIPTION OF THE INVENTION

Figure 1:
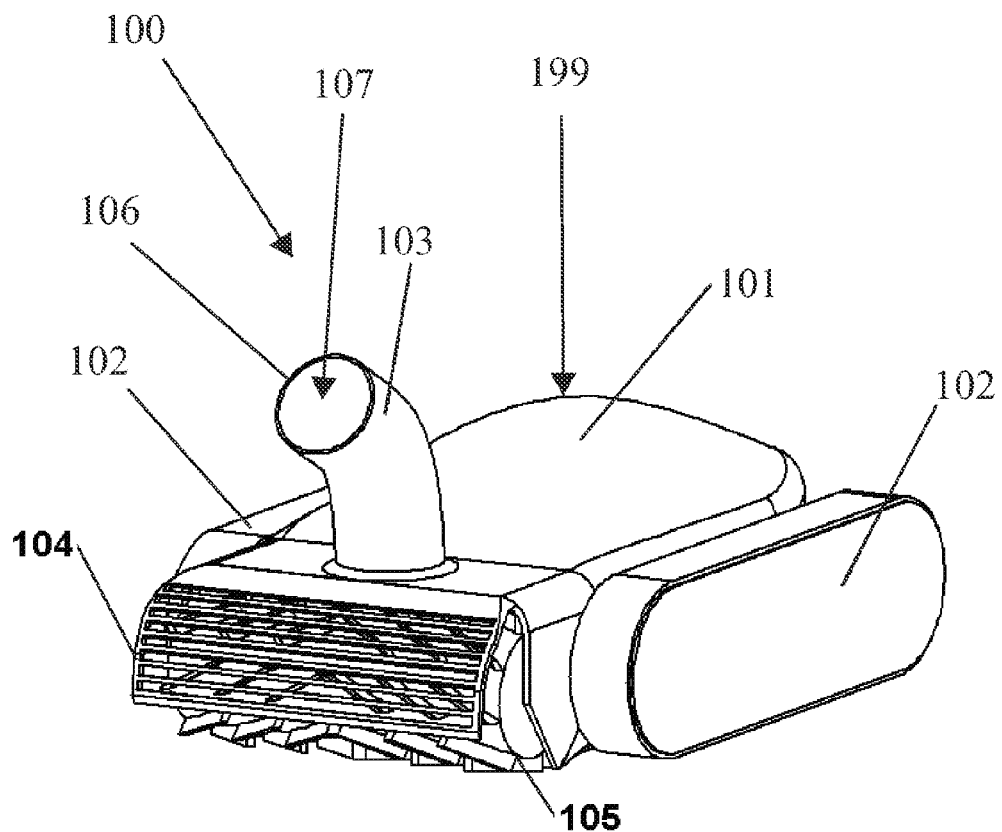
FIG. 1 is a perspective view of an autonomous robot apparatus in accordance with one embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
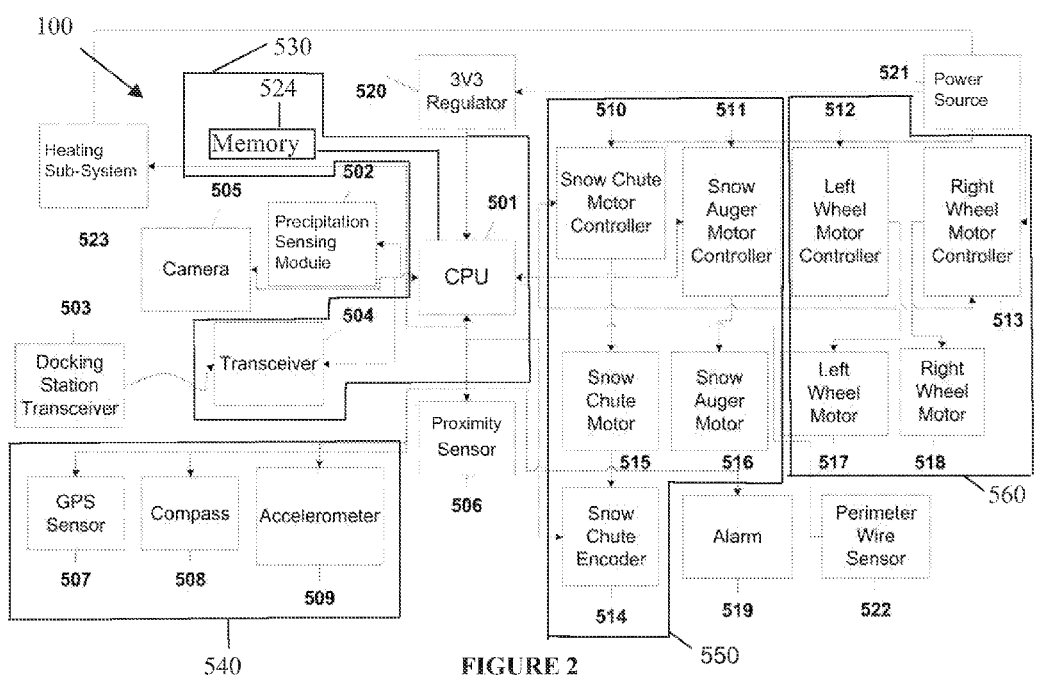
FIG. 2 is a schematic of the components of the autonomous robot apparatus of FIG. 1.

Referring first to FIGS. 1 and 2 concurrently, an autonomous robot apparatus 100 will be described in accordance with an embodiment of the present invention. The autonomous robot apparatus 100 generally comprises an autonomous robot 199, a chassis 101, a plurality of wheels 102 mounted to the chassis 101, a drive system 560 mounted to the chassis 101 and operably coupled to the plurality of wheels 102, a snow-removal sub-system 550, and a control module 530 operably coupled to each of the drive system 560 and the snow-removal sub-system 550. The autonomous robot apparatus 100 may also include, in some embodiments, a location and orientation identification (LOI) module 540, which is also operably coupled to the control module 530. The specific components and functions of each of the systems and modules noted above will be discussed in more detail below. It should be noted that the particular shape, basic features and structural details of the autonomous robot apparatus 100 are not to be considered limiting of the present invention in all embodiments. Rather, in certain specific embodiments, the invention is directed to the integrated control, mapping and operating systems and methods.

The autonomous robot 100 is designed and configured to perform a task within a desired work area. As discussed in more detail below, the task in certain embodiments is snow or other freezing or frozen precipitation removal and the desired work area is a driveway, a patio, a parking lot, a walkway, a road, a highway or the like. In certain embodiments, the desired work area may be a bounded area. For example, the desired work area may be defined/bounded through the use of physical structures or non-physical structures, such as including, for example without limitation, perimeter wires, beacons, structures, satellite navigation, mathematical methods that define a perimeter, or any other method used to define a confined area. Thus, when the work area is a driveway, the driveway may have a perimeter wire positioned around the perimeter of the driveway and the autonomous robot 100 will perform its task, such as snow clearing, within the bounds of the perimeter wire (i.e., on the driveway).

In one aspect, the invention is an autonomous robot having an integrated robot control system that maps and stores the perimeter of the desired area of confinement by relating its current position to an established starting point of the autonomous robot. Such a control system is described in detail in U.S. Pat. No. 8,428,776 and U.S. Patent Application No. 2012/0265391, the entireties of which are incorporated herein by reference. When in use, the autonomous robot stays within the defined perimeter by monitoring and mapping its own location with respect to the stored perimeter at all times. The exemplified embodiment will be discussed below with regard to the use of a perimeter wire to define the area of confinement. However, it should be appreciated that the invention is not to be so limited in all embodiments and any of the above-identified methods of defining the area of confinement can be used.

The control module 530 generally comprises a computer processing unit (CPU) 501, a memory 524 and a transceiver 504 that are operably coupled together. The CPU 501 analyzes all of the information provided/transmitted to it in order to provide instructions to each of the other components of the autonomous robot apparatus 100. The CPU may be any type of microprocessor, micro-controller, computational, or programmable device or circuit configured for executing computer program instructions (e.g. code). Various processors may be included and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

The memory 524 may be a memory device that stores instructions for the autonomous robot 199 to perform a work routine within a desired work area. The memory 524 may store information related to the area of confinement within which the autonomous robot 199 is intended to perform the work function (i.e., snow clearing), the memory 524 may store information regarding patterns that the autonomous robot 199 should take when performing its work function, and the memory 524 may store any other information that could be useful for the autonomous robot 199 in performing its desired function in the desired area or location.

The transceiver 504 is capable of sending signals, data and information to and receiving signals, data and information from any of the other various components. For example, in one embodiment the autonomous robot apparatus 100 may include a docking station that tracks the accumulation of precipitation. The docking station may include a docking station transceiver 503. Upon a certain accumulation, the docking station transceiver 503 may transmit information relating to the accumulation of precipitation to the transceiver 504 of the control module 530 of the autonomous robot apparatus 100. Thus, the transceiver 504 facilitates communication between the various components of the autonomous robot apparatus 100.

In the exemplified embodiment, the autonomous robot apparatus 100 has two wheels 102 located on opposing sides of the chassis 101. The wheels 102 in the exemplified embodiment are tracked wheels, and in one particular embodiment the tracked wheels are 2"-2.5" wide by about 64" long by $\frac{3}{16}$"-$\frac{1}{4}$" thick. Of course, other dimensions for the wheels 102 are possible. Furthermore, in some embodiments the wheels 102 may be round rather than ovular. Thus, the wheels 102 may be wheels that are similar to those found on road vehicles. Alternatively, the wheels may be small spherical protrusions that protrude from the bottom of the autonomous robot 199 to facilitate movement of the autonomous robot 199. Thus, the wheels 102 can take on any desired structure so long as the wheels 102 are capable of causing the autonomous robot 199 to move in a desired/instructed direction. Furthermore, although two wheels are illustrated in the exemplified embodiment, more than two wheels are possible in other embodiments, such as three wheels, four wheels, five wheels, six wheels, seven wheels, eight wheels or the like. The specific structure, dimensions and the like of the wheels 102 are not to be limiting of the present invention unless so specified in the claims. Furthermore, it should be noted that in one exemplary embodiment the autonomous robot 199 has dimensions of approximately 28" long and 16" wide. The exact dimensions of the autonomous robot apparatus 100 are not to be limiting of the present invention in all embodiments.

The drive system 560 generally comprises a left wheel motor controller 512, a right wheel motor controller 513, a left wheel motor 517 and a right wheel motor 518. These various controllers and motors, along with the wheels 102, facilitate movement of the autonomous robot apparatus 100. As noted above, the drive system 560 is operably coupled to the control module 530 and controls, among other things, movement of the autonomous robot apparatus 100.

In the exemplified embodiment, the CPU 501 of the control module 530 is operably coupled to each of the left wheel motor controller 512 and the right wheel motor controller 513 via general purpose input/output pins. To activate the left or right wheel motor controllers 512, 513 the CPU 501 of the control module 530 transmits a pulse width modulated (PWM) signal with the desired frequency and duty cycle to control the left and right wheel motor's 517, 518 speed and direction. Of course, any other techniques for causing movement of the wheels 102 can be utilized as desired.

The snow-removal sub-system 550 is operably coupled to the control module 530 and to the chassis 101. The snow-removal sub-system 500 is configured to extract snow or other precipitant from the ground (i.e., a driveway) and to output the extracted snow in a desired direction relative to the chassis 101. Specifically, in the exemplified embodiment the snow-removal sub-system 550 comprises a directing device 103 and an auger 105, as well as various controllers, motors and encoders. The auger 105 is the device that extracts the snow or other precipitant from the ground or other surface. The directing device 103 is the device that outputs the extracted snow in a desired direction relative to the chassis 101.

The directing device 103 and the auger 105 are coupled to the chassis 101 and the various controllers, motors and encoders are operably coupled to the control module 530 so that the control module 530 can control movement and operation of the directing device 103 and auger 105. In the exemplified embodiment, the autonomous robot apparatus 100 also comprises a safety barrier 104 that prevents people or animals from contacting the auger 105. Specifically, in the exemplified embodiment the safety barrier 104 is a plate having slots formed therein that is coupled directly to the chassis 101 so as to cover the auger 105 to prevent a person or animal from contacting the auger 105. The slotted design allows snow or other precipitants to pass through the safety barrier 104 while preventing people or animals from contacting the auger 105.

As described herein and illustrated in FIG. 1, the directing device 103 is a chute that determines the direction that the snow will be thrown upon it being extracted from the ground. Thus, the terms "directing device" and "snow chute" may be used interchangeably herein. In one embodiment discussed in more detail below, the direction that the snow is thrown (and thus the positioning of the directing device 103 relative to the chassis 101) automatically changes during a work routine in order to throw the snow in the most desirable direction. The directing device 103 has one end coupled directly to the chassis 101 and a second terminal end 106 having an opening 107 formed therein. During operation, snow is extracted from the ground using the auger 105 and forced through the directing device 103 and out through the opening 107 to a desired discharge location. Furthermore, although the autonomous robot apparatus 100 is described herein with the snow-removal sub-system 550 comprising the directing device 103 and the auger 105, the invention is not to be so limited in all embodiments. Specifically, in certain other embodiments the snow-removal sub-system 550 may simply comprise a snowplow for pushing the snow in a desired direction, or any other structural components that are commonly used for snow removal.

In certain embodiments of the present invention, the autonomous robot apparatus 100 is a single stage snow blower system. In that regard, the only structural components needed for snow removal are the directing device 103 and the auger 105. However, the invention is not to be so limited in all embodiments and in certain other embodiments the autonomous robot apparatus 100 may be a two-stage snow blower system, in which case the snow-removal sub-system 500 may also include an impeller for forcing the snow through the directing device 103. Such an impeller may be beneficial to ensure that snow that is forced through the directing device 103 is thrown with sufficient force to cause the snow to exit the bounded work area. Furthermore, although in the exemplified embodiment only a single auger and a single directing device 103 are depicted, in other embodiments multiple augers may be included.

In the exemplified embodiment, the snow-removal sub-system 550 also comprises a snow chute motor controller 510, a snow auger motor controller 511, a snow chute motor 515, a snow auger motor 516 and a snow chute encoder 514. In this embodiment, the auger 105 may be connected to the snow auger motor 516 by a belt and pulley system (not illustrated), although other connection techniques may be used. In certain embodiments, the auger 105 is designed to scoop/extract snow as it revolves at approximately 4000 revolutions per minute generating enough centripetal force to allow the snow to exit from the directing device 103. Of course, the auger 105 can revolve at more or less than 4000 revolutions per minute in other embodiments. For example, the auger 105 can revolve at more than 4000 revolutions per minute if such speed is needed for a heavy snow removal or less than 4000 revolutions per minute to save battery in accordance with the design specifications. Thus, the invention is not to be limited by the speed of rotation of the auger 105 unless so specified in the claims.

The snow chute encoder 514 is connected to the CPU 501 of the control module 530 via a general purpose input pin. As the snow chute motor 515 revolves the snow chute encoder 514 transmits a pulse of logic HIGH and logic LOW to indicate movement to the CPU 501 per the snow chute encoder's 514 resolution. The CPU 501 is connected to the snow chute motor controller 510 via general purpose input/output pins. To activate the snow chute motor controller 510 the CPU 501 sends a pulse width modulated (PWM) signal with the desired frequency and duty cycle to control the snow chute motor's 515 speed and direction. The CPU 501 is connected to the snow auger motor controller 511 via general purpose input/output pins. To activate the snow auger motor controller 511 the CPU 501 sends a pulse width modulated (PWM) signal with the desired frequency and duty cycle to control the snow auger motor's 516 speed and direction. In one embodiment of the operation, the CPU 501 computes the snow auger speed based on the load placed on the snow auger motor 536. For example, if the load is small the CPU 501 may increase the speed of the snow auger motor 516 and drive motors 517, 518 enabling the snow blower robot to clear the bounded area of snow faster.

The autonomous robot apparatus 100 also comprises a power source 521 and a 3V3 regulator 520. In the exemplified embodiment, the power source 521 is a 24 volt battery. However, the invention is not to be so limited in all embodiments and the power source 521 may be any other type of battery, or it may be solar power, AC power or the like. The power source 521 provides power to the 3V3 regulator 520 as well as provides power to the motor controllers 510, 511, 512, and 513, the CPU 501 of the control module 530, and any other components of the autonomous robot apparatus 100 described herein below.

As noted above, the autonomous robot apparatus 100 comprises an LOI module 540 that is operably coupled to the control module 530. In the exemplified embodiment, the LOI module 540 comprises a global positioning system (GPS) sensor 507, a compass 508 and an accelerometer 509. Of course, the invention is not to be so limited and in certain embodiments any of one or more of the GPS sensor 507, the compass 508 and the accelerometer 509 may be included in the autonomous robot, apparatus 100. Furthermore, components other than the GPS sensor 507, the compass 508 and the accelerometer 509 may form a part of the LOI module 540 as long as the LOI module 540 is able to perform its intended function.

In that regard, the LOI module 540 is configured to determine the location and orientation of the chassis 101 of the autonomous robot apparatus 100. In embodiments that include the GPS sensor 507, the GPS sensor 507 may be coupled to the control module 530 via USART. The GPS sensor 507 transmits data regarding the location on the Earth (such as using longitude-latitude coordinates or the like) of the center of the chassis 101 of the autonomous robot apparatus 100 to the control module 530. In embodiments that include the compass 508, the compass 508 may be coupled to the control module 530 via Inter-integrated Circuit (I$^2$C). The compass 508 transmits data regarding the direction in which the front face of the chassis 101 is facing to the control module 530. In embodiments that include the accelerometer 509, the accelerometer 509 may be coupled to the control module 530 via serial peripheral interface bus (SPI). The accelerometer 509 transmits data regarding the acceleration of the autonomous robot apparatus 100 in three axes. The accelerometer 509 may also facilitate obstacle detection by enabling the control module 530 to compute the moving average of the acceleration data over time so that a step (or spike) in the data correlates to an impact (such as from an obstacle). The LOI module 540 is operably coupled to the control module 530 and transmits to the control module 530 information indicative of the chassis' location and orientation. This assists the control module 530 in determine a proper positioning of the directing device 103 as will be discussed in more detail below with reference to FIGS. 9 and 10.

Using the combination of the components of the LOI 540 (i.e., the GPS sensor 507, the compass 508 and the accelerometer 509), the control module 530 can determine the position of the autonomous robot apparatus 100 relative to a boundary (i.e., a perimeter wire or a pre-defined boundary as discussed above). Furthermore, the components of the LOI 540 collectively provide the control module 530 with sufficient information for the control module 530 to determine the location and orientation of the chassis 101 on Earth and relative to the boundary. The calculation of this information enables the control module 530 to automatically control and change the direction and orientation of the directing device 103 to ensure that the snow (or other precipitant) that is extracted from the ground is expelled to a location outside of the desired boundary (so that snow is not being picked up from one location on the driveway and thrown to another location on the driveway, but rather is thrown to a location that is off of the driveway entirely). The control module 530 may automatically, without user intervention or input, change the orientation of the directing device 103 to ensure that the snow is expelled to a desired location based on the location of the chassis 101 of the autonomous robot apparatus 100 relative to known boundaries of the work area. This feature will be discussed in more detail below with reference to FIGS. 9 and 10.

In some embodiments, the autonomous robot apparatus 100 further comprises a heating sub-system 523, a camera 505, a proximity sensor 506 (or a passive infrared (PIR) sensor), an alarm 519 and a perimeter wire sensor 522, each of which is operably coupled to the control module 530. These components may be discussed in more detail below, but a brief description directly follows. In one specific embodiment, the heating sub-system 523 is configured to push air out of the bottom of the autonomous robot 199 in order to melt ice that may be obstructing the autonomous robot 199. Thus, the heating sub-system 523 is configured to generate and direct thermal energy to a position below the chassis 101. In that regard, the heating sub-system 523 may comprise a heater, such as a ceramic heater or the like, and a fan. The heater will generate the thermal energy and the fan will push the hot air around the heating element and out of the bottom of the robot to melt ice that could be obstructing the autonomous robot 100. The heating sub-system 523 may also heat the autonomous robot 199 (i.e., the chassis, motors, etc.) to prevent failures of operation due to freezing of the robot. In some embodiments additional heating elements may be embedded in the body and chassis of the autonomous robot apparatus 100 to prevent weather related entrapment.

The camera 505 may be connected to the CPU 501 via universal synchronous/asynchronous receiver/transmitter (USART). The camera 505 may be used for obstacle avoidance, location detection and precipitation accumulation measurement. As an alternative to the camera 505, the autonomous robot apparatus 100 may include an infrared sensor, ultrasonic sensors, a capacitance based proximity field of the like to detect obstacles. During snow clearing or work routine operations, the autonomous robot apparatus 100 is continuously searching for obstacles in some embodiments using any of the above-identified components.

The proximity sensor 506 may be coupled to and communicate with the CPU 501 via single bit communication. The proximity sensor 506 is configured to detect whether an undesired object is located near the autonomous robot 199 and prohibits activation of the autonomous robot 199 if such undesired object is detected. In one embodiment the proximity sensor 506 may detect capacitance levels of objects located in the vicinity of the autonomous robot apparatus 100 and compare those capacitance levels to baseline levels in order to determine if undesired objects (such as humans or animals) are located in the vicinity of the autonomous robot apparatus 100. In other embodiments the proximity sensor 506 may be a. passive infrared (PIR) sensor that measures motion by measuring the infrared levels of surrounding objects.

Finally, the alarm may be coupled to the CPU 501 via a general purpose output pin. The CPU 501 can send a pulse width modulated (PWM) signal with a desired frequency and duty cycle to control the volume and pitch of the alarm 519. The alarm 519 may be activated in response to the proximity or PIR sensor 506 detecting an undesired object in the vicinity of the autonomous robot 199. This will signal to a person in the vicinity of the autonomous robot 199 to move away from the autonomous robot 199 to enable the autonomous robot 199 to perform a snow clearing operation.

The perimeter wire sensor 522 is in use when a perimeter wire is used to mark the boundaries of the desired area within which the autonomous robot apparatus 100 is intended to perform its work routine. In the exemplified embodiment, the perimeter wire sensor 522 is operably coupled to the CPU 501 through an onboard analog to digital converter. The perimeter wire sensor 522 provides voltage readings that correspond to the intensity of a magnetic field of a tuned frequency. This assists in informing the autonomous robot apparatus 100 when it is in close proximity to the perimeter wire, so that the control module 530 can instruct the autonomous robot apparatus 100 in its manner of movement.

The autonomous robot apparatus 100 of the present invention is designed to automatically activate and perform a work routine, without human or other user intervention (after an initial setup procedure), upon detecting various accumulation levels of precipitation, including freezing precipitation such as freezing drizzle, freezing rain and rain/snow mixtures and frozen precipitation such as snow, snow grains, ice pellets/sleet, hail, snow pellets/Graupel and ice crystals. It is desired that the autonomous robot apparatus 100 is not activated to perform a work routine upon the accumulation of liquid precipitation such as drizzle and rain. Specifically, the work routine that is performed by the autonomous robot apparatus 100 is a snow clearing routine, where snow clearing includes clearing any of the forms of freezing and frozen precipitation noted above. Thus, the autonomous robot apparatus 100 can detect accumulation of freezing and frozen precipitation, and can then clear a desired work space of that accumulated freezing and frozen precipitation. The autonomous robot apparatus 100 can decipher between liquid precipitation and freezing/frozen, precipitation so that the autonomous robot apparatus 100 is not activated to perform a work routine upon the accumulation of liquid precipitation. In certain embodiments the desired work space is a driveway, a parking lot, a walkway, a patio, a road, a highway or any other area on which snow removal is desired upon its accumulation thereon. However, in one specific embodiment, the autonomous robot apparatus 100 is intended for consumer use at their home for clearing their driveway, walkway or patio of freezing and frozen precipitation.

Figure 5A:
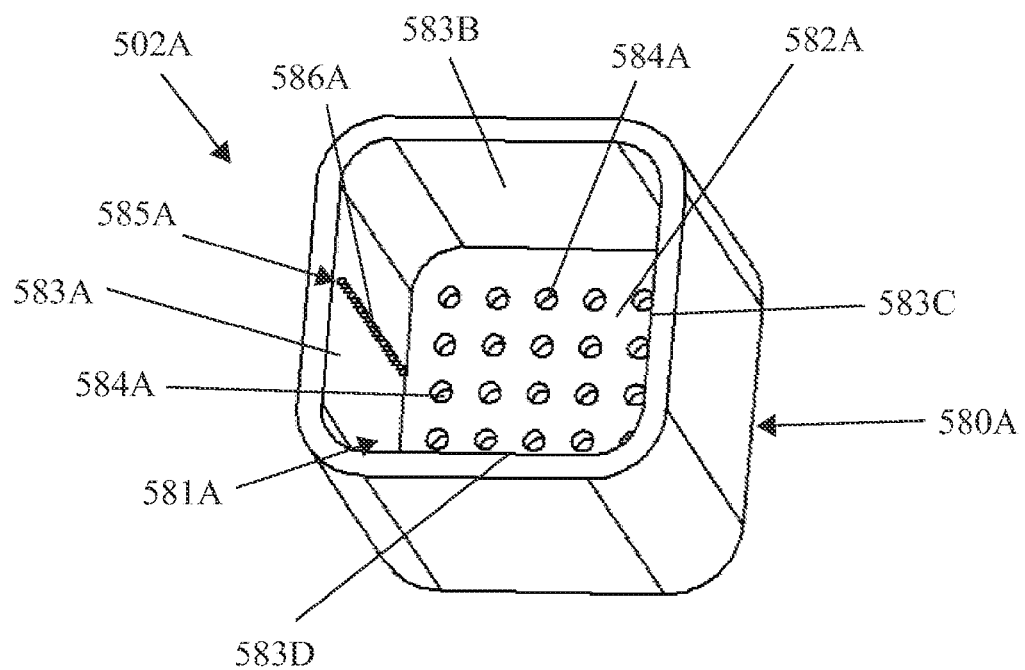
FIG. 5A is a perspective view of an accumulation level sensor in accordance with a first embodiment of the present invention.
Figure 5B:
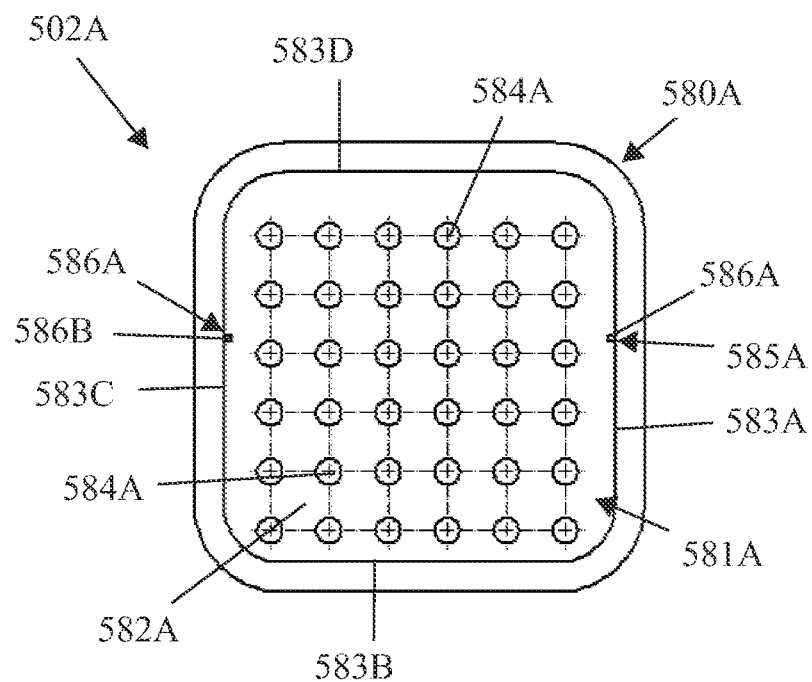
FIG. 5B is a top view of the accumulation level sensor of FIG. 5A.

Referring now to FIGS. 2, 5A and 5B concurrently, the autonomous robot apparatus 100 will be further described. The autonomous robot apparatus 100 comprises a precipitation sensing module 502. The precipitation sensing module 502 is configured to sense the accumulation of freezing and frozen precipitation and to transmit signals indicative of such accumulation to the control module 530 so that the control module 530 can initiate activation of the autonomous robot apparatus 100 to perform a snow clearing operation. In that regard, the precipitation sensing module 502 is operably coupled to the control module 530, and in some embodiments to the CPU 501. Two exemplary embodiments of the precipitation sensing module 502 will be discussed in detail below with reference to FIGS. 5A, 5B and 6.

The precipitation sensing module 502 may be coupled directly to the chassis 101 of the autonomous robot apparatus 100 in one embodiment. In another embodiment, the precipitation sensing module 502 may be coupled to a docking station that is in operable communication with the control module 530 of the autonomous robot apparatus 100. In yet another embodiment, the precipitation sensing module 502 may be a stand-alone structure that operably communicates with the control module 530 of the autonomous robot apparatus 100. In any of these embodiments, the precipitation sensing module 502 may wirelessly (or via hard-wire connection if desired) communicate with the control module 530 to transmit signals to the control module 530 indicative of the precipitation accumulation levels. In some embodiments, the precipitation sensing module 502 may communicate with the docking station, and the docking station may transmit signals indicative of the precipitation accumulation to the control module 530. Thus, the precipitation sensing module 502 may directly or indirectly via the docking station communicate with or transmit information/signals to the control module 530 either wirelessly or via a hard wire connection.

Figure 6:
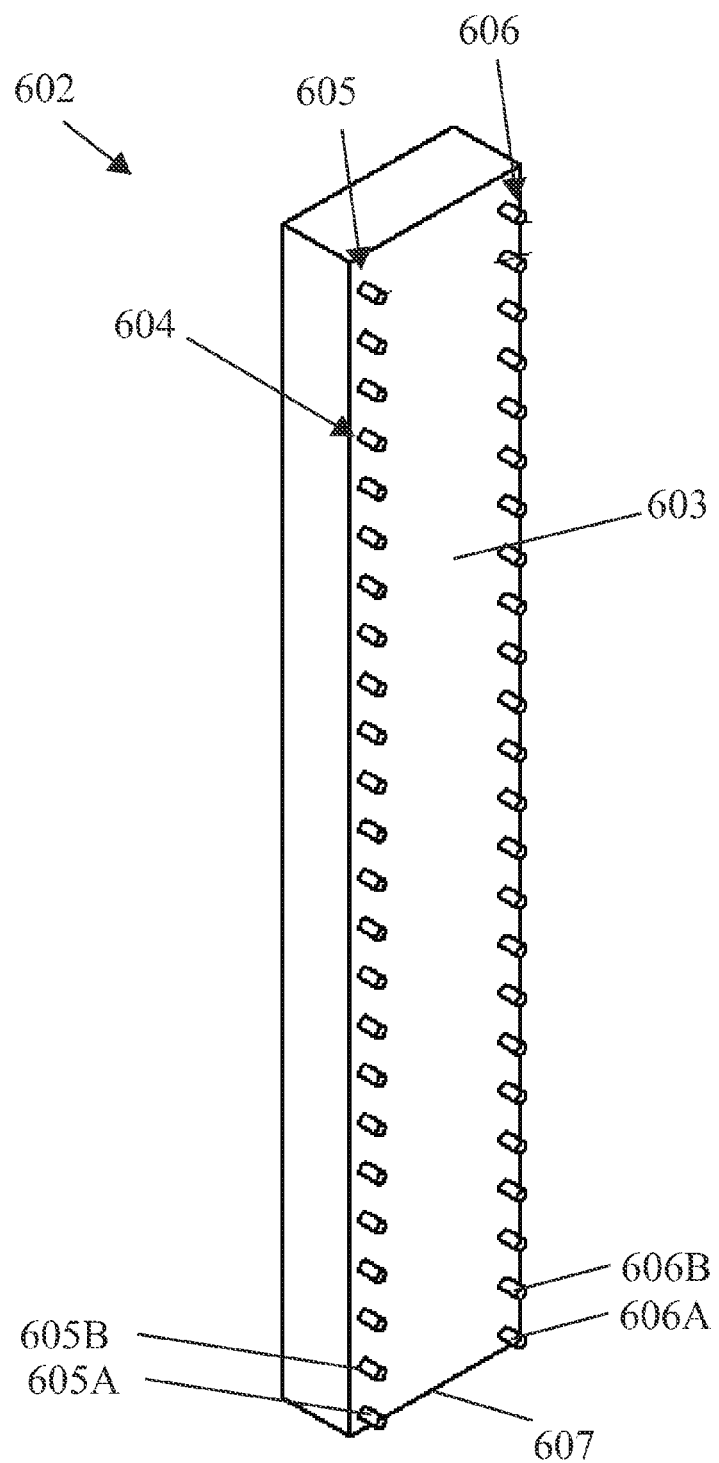
FIG. 6 is a perspective view of an accumulation level sensor in accordance with a second embodiment of the present invention.

FIGS. 5A and 5B illustrate a first structural embodiment of a precipitation sensing module 502A. In the exemplified embodiment, the precipitation sensing module 502A is a container or cup-like structure 580A that defines an accumulation, cavity 581A. Specifically, the container 580A comprises a floor 582A and a plurality of sidewalls 583A, 583B, 583C, 583D extending upwardly from the floor 582A. The accumulation cavity 581A is defined by the floor 582A and the sidewalls 583A-D. Of course, the invention, is not to be so limited by the structure of the precipitation sensing module 502A in all embodiments. Thus, although depicted in this embodiment as a container, in certain other embodiments other structural configurations are possible, one of which is depicted in FIG. 6 and discussed in more detail below.

In the exemplified embodiment, a plurality of drainage apertures 584A are formed into the floor 582A of the container 580A. Although a plurality of the drainage apertures 584A are depicted, in certain embodiments there may only be a single drainage aperture 584A. The drainage apertures 584A prevent the accumulation of liquid precipitation, such as rain, from accumulating in the container 580A. As a result, the precipitation sensing module 502A will not send activation signals due to liquid precipitation, accumulation. However, in certain embodiments the drainage apertures 584A are sufficiently small so that freezing and frozen precipitation will not drain through the container 580A, but rather will accumulate within the accumulation cavity 581A of the container 580A. Thus, the drainage apertures 584A permit the accumulation of freezing or frozen precipitation within the accumulation cavity 581A of the container 580A while preventing the accumulation of liquid precipitation within the accumulation cavity 581A of the container 580A.

The precipitation sensing module 502A comprises an accumulation level sensor 585A. In the exemplified embodiment, the accumulation level sensor 585A comprises a plurality of sensors 586A mounted on the sidewall 583A of the container 580A and a plurality of sensors 586B mounted on the sidewall 583C of the container 580A. Furthermore, in the exemplified embodiment the sidewalls 583A and 583C are opposing one another. However, the invention is not to be so limited in all embodiments and in certain other embodiments each of the sidewalls 583A and 583B may include the sensors 586A, 586B thereon. Specifically, any of two or more of the sidewalls 583A-D may include the sensors 586A, 586B thereon in certain embodiments. In other embodiments two vertical rows of sensors may be provided on a single one of the sidewalls 583A-D. In still other embodiments, only a single vertical row of sensors is provided on a single one of the sidewalls 583A-D.

In the exemplified embodiment, the sensors 586A, 586B are electrodes. However, the invention is not to be so limited and other features that achieve the desired result, discussed herein below, can be used. The sensors 586A, 586B are mounted to the sidewalls 583A, 583C at different vertical heights such that each of the sidewalls 583A and 583C has a plurality of sensors 586A, 586B that are spaced apart in a vertical direction along that sidewall 583A, 583C (i.e., the plurality of sensors 586A, 586B are arranged in a spaced apart manner in vertical rows). Furthermore, the sensors 586A, 586B on the opposing sidewalls 583A, 583C are horizontally/transversely aligned with one another. Thus, a bottom-most sensor of the sensors 586A is horizontally aligned with a bottom-most sensor of the sensors 586B, the second sensor from the floor 582A of the sensors 586A is horizontally aligned with the second sensor from the floor 582A of the sensors 586B, and so on.

Thus, when the container 580A is used as the precipitation sensing module 502A, freezing and frozen precipitation that falls will accumulate in the container 580A. The level of the accumulated precipitation will be monitored with the precipitation sensing module 502A as follows. When the accumulation level is such that the precipitation is in contact with a bottom-most sensor of the sensors 586A on the sidewall 583A and a bottom-most sensor of the sensors 586B on the sidewall 583A and the precipitation extends continuously between the two bottom-most sensors, the precipitation will complete an electrical connection (due to the conductivity of the precipitant, such as snow) between the bottom-most sensors of the sensors 586A, 586B. Specifically, the electrical connection is completed when the snow or other precipitant is in contact with both bottom-most sensors and when the precipitant extends continuously between the two bottom-most sensors. This completion of the electrical connection between the bottom-most sensors 586A on the sidewalls 583A, 583C will cause the precipitation sensing module 502A to generate and transmit a first signal to the control module 530.

In certain embodiments, the precipitation sensing module 502A only transmits information, such as the first signal, to the control module 530 upon being polled/pinged for such information. In other embodiments, the precipitation sensing module 502A may transmit the signals to the control module 530 immediately upon the electrical connection being completed as noted above. The precipitation sensing module 502A may be operably coupled to the control module 530 using a hardwire connection, or a wireless connection such as Bluetooth, UART, I²C, ADC or any other form of data communication.

In certain embodiments, the precipitation sensing module 502 may include a transceiver to enable the first signal to be transmitted from the precipitation sensing module 502 to the control module 530. In other embodiments, the precipitation sensing module 502 may be positioned directly on the autonomous robot 199 such that the control module 530 is directly coupled to the precipitation sensing module 502. In still other embodiments, the precipitation sensing module 502 may be positioned on a docking station, and a transceiver of the docking station may transmit the first signal to the control module 530.

Upon the first signal being received by the control module 530, the control module 530 will activate the autonomous robot apparatus 100 to perform a first instance of a work routine. Thus, upon the first signal being received by the control module 530, the control module may activate the autonomous robot apparatus 100 from a non-activated state (which can include powering on the autonomous robot apparatus 100 in some embodiments). Then, after the autonomous robot apparatus 100 is activated, the autonomous robot apparatus 100 will be made to perform a first instance of the work routine.

As discussed above, in certain embodiments the work routine is a snow clearing operation within a bounded area, which may be bounded by automated techniques or by physical or non-physical boundaries, as discussed in detail above. Thus, upon the accumulation level sensor 585A detecting that the predetermined initial accumulation level of the precipitant (i.e., snow) has been reached (such as by the snow extending between and contacting each of the bottom-most sensors as discussed above), the control module 530 causes the autonomous robot apparatus 100 to clear snow within the bounded area (i.e., from the driveway or the like). The autonomous robot apparatus 100 will traverse the work area (i.e., the space defined by the bounded area, such as a driveway) and perform its snow cleaning -function/ work routine within that work area. The autonomous robot apparatus 100 will maneuver in a predetermined pattern that ensures that in a single work session (i.e., the first instance of the work routine), the autonomous robot traverses the entirety of the work area to clear the entire work area of accumulated precipitant, (e.g., snow).

The bottom-most sensors of the sensors 586A, 586B can be spaced any desired height from the floor 582A of the container 580A so that the first signal is transmitted to the control module 530 upon a desired predetermined initial accumulation level being detected. Thus, in certain embodiments it may be desirable to space the bottom-most sensors of the sensors 586A, 586B approximately ¼ inch from the floor 582A of the container 580A. In other embodiments it may be desirable to space the bottom-most sensors of the sensors 586A, 586B approximately ⅜ inch, ½ inch, ⅝ inch, ¾ inch or one inch from the floor 582A of the container 580A. It should be appreciated that the distance that the bottom-most sensor is spaced from the floor 582A of the container 580A dictates the amount of accumulation of the precipitant that will be required before the first signal will be generated and transmitted to the control module 530. Thus, for example, if the bottom-most sensors of the sensors 586A, 586B are spaced ½ inch from the floor 582A of the container 580A, upon ½ inch of the precipitant accumulating in the container 580A, the electrical connection between the bottom-most sensors of the sensors 586A, 586B will be completed and the first signal will be generated and transmitted to the control module 530.

Furthermore, the additional sensors of the sensors 586A, 586B can be spaced apart from each other at equal or unequal increments. In one embodiment, the sensors will be vertically equi-spaced from each other. Thus, if the bottom-most sensors of the sensors 586A, 586B are spaced ½ inch from the floor 582A of the container 580A, the sensors adjacent to the bottom-most sensors will be spaced ½ inch from the bottom-most sensors and so on. In certain embodiments the vertical distance between adjacent ones of the sensors 586A, 586B may gradually increase or gradually decrease the further the sensors are located from the floor 582A of the container 580A. If the vertical distance between adjacent ones of the sensors 586A, 586B gradually increases with distance from the floor 582A of the container 580A, the time delay between subsequent instances of the work routine will also gradually increase. If the vertical distance between adjacent ones of the sensors 586A, 586B gradually decreases with distance from the floor 582A of the container 580A, the time delay between subsequent instances of the work routine will also gradually decrease.

Thus, as noted above, upon the accumulation level achieving the initial accumulation level, such that the precipitant is in contact with the bottom-most sensor of the sensors 586A and 586B, a first signal will be transmitted to the control module 530, and the control module will activate the autonomous robot apparatus 100 to perform a first instance of a work routine. If the precipitation continues to fall, eventually the accumulation level will reach a predetermined secondary accumulation level such that the precipitant is in contact with the ones of the sensors 586A and 586B that are adjacent to (and vertically above) the bottom-most sensor. Upon this secondary accumulation level being reached, a second signal will be generated and transmitted to the control module 530. Upon the control module receiving the second signal, the control module 530 will cause the autonomous robot apparatus 100 to perform a second instance of the work routine.

In certain embodiments, the precipitation may be accumulating very quickly such that the secondary accumulation level is reached before the autonomous robot apparatus 100 has completed the first instance of the work routine. In one embodiment, upon the secondary accumulation level being reached, the control module 530 may log instruction to perform the second instance of the work routine subsequent to completion of the first instance of the work routine. In such instances, the autonomous robot apparatus 100 may continue to complete the first instance of the work routine, and will then immediately begin the second instance of the work routine. Thus, in such an embodiment the autonomous robot apparatus 100 will not begin the second instance of the work routine until the first instance of the work routine is completed (i.e., the entire driveway has been traversed by the autonomous robot apparatus 100 and the snow clearing function has been completed on the entire driveway).

In other embodiments, upon the secondary accumulation level being reached, the autonomous robot apparatus 100 may immediately begin the second instance of the work routine at the location where it started the first instance of the work routine without first completing the first instance of the work routine. In such embodiments upon the secondary accumulation level being reached and the second signal being received by the control module 530, the autonomous robot apparatus 100 will immediately cease the first instance of the work routine and begin the second instance of the work routine at the same starting location. In still other embodiments, upon the secondary accumulation level being reached, the autonomous robot apparatus 100 may first complete the first instance of the work routine, and then proceed to a charging apparatus for a predetermined period of time, and then start the second instance of the work routine upon having a sufficient charge to compete the second instance of the work routine.

This same process may continue as the precipitant continues to accumulate within the container 580A or other precipitation sensing module 502A. Thus, the accumulation may reach a third, fourth, fifth, etc. accumulation level and send corresponding signals to the control module 530 so that the autonomous robot apparatus 100 will continue to conduct third, fourth, fifth, etc. instances of the work routine. Thus, any time that the accumulation level increases a level (by contacting and extending between horizontally/transversely aligned sensors that are positioned a vertical level above the previously activated sensors), the autonomous robot apparatus 100 will perform an instance of the work routine.

Thus, the autonomous robot apparatus 100 of the present invention clears snow from a desired location, such as a driveway, as the snow falls without waiting for an entire snowfall to be completed. The autonomous robot apparatus 100 is designed to clear the snow when a low accumulation level of the snow has fallen, such as ¼ inch or ½ inch or the like, and to continue clearing the snow as additional ¼ or ½ inches of accumulation is detected. Therefore, if six inches of snow falls during one snowstorm and the autonomous robot apparatus 100 is configured to perform the work routine at ½ inch increments, the autonomous robot apparatus 100 may perform twelve iterations of the work routine during that one snowfall. This reduces the amount of battery power required for the autonomous robot apparatus 100 to perform each instance of the snow clearing routine (because less snow accumulation during each instance of the work routine equates to less power required to remove the snow during each instance of the work routine).

In the embodiment discussed above, the accumulation level sensor 585A comprises a plurality of sensors 586A, 586B on opposing sidewalls of the precipitation sensing module 502A or container 580A. However, the invention is not to be so limited in all embodiments. In certain embodiments the accumulation level sensor 585A may only include sensors 586A on one sidewall of the precipitation sensing module 502A or container 580A. In such embodiments, the sensors 586A may be positive electrodes and a single negative electrode may be located in the floor 582A of the container 580A or elsewhere. Various permutations of the above exemplary description of one possible precipitation sensing module are possible within the confines of this invention.

Referring now to FIG. 6, a second embodiment of a precipitation sensing module 602 is illustrated in accordance with an embodiment of the present invention. The precipitation sensing module 602 functions in a very similar way to the precipitation sensing module 502A. Specifically, the precipitation sensing module 602 comprises a base 603 and an accumulation level sensor 604 mounted or coupled to the base 603. Specifically, the accumulation level sensor 604 comprises a first row of sensors 605 arranged in a first vertical row and a second row of sensors 606 arranged in a second vertical row. in the exemplified embodiment the base 603 is a rectangular shaped structure, although the invention is not to be particularly limited in that regard. Furthermore, although not illustrated herein, in certain embodiments the base 603 may be a stake such that a bottom edge of the stake has a pointed end to facilitate inserting the base 603 into the ground. In other embodiments the base 603 may be coupled to the autonomous robot 199 directly, or to a docking station as discussed in more detail below with reference to FIG. 8.

In FIG. 6, the first row of sensors 605 comprises a bottom-most sensor 605A and the second row of sensors comprises a bottom-most sensor 606A. The bottom-most sensor 605A of the first row of sensors 605 is horizontally or transversely aligned with the bottom-most sensor 606A of the second row of sensors 606. The bottom most sensors 605A, 606A are spaced at a first vertical height from a bottom edge 607 of the base 603. The first vertical height is a predetermined height such that upon precipitation such as snow accumulating to the first vertical height, the autonomous robot apparatus 100 will be made to perform a first instance of the snow clearing work routine. Thus, the first vertical height can be ⅓ inch, ¼ inch, ½ inch, ⅔ inch, ¾ inch, one inch or any other desired vertical height as discussed above. Furthermore, each sensor of the first row of sensors 605 and each sensor of the second row of sensors 606 is vertically spaced from adjacent sensors by a vertical height that can be ⅓ inch, ¼ inch, ½ inch, ⅔ inch, ¾ inch, one inch or any other desired vertical height as discussed above.

In operation, the precipitation sensing module 602 is positioned so that the bottom edge 607 of the base 603 is adjacent to the ground surface. Thus, as precipitation such as snow accumulates on the ground, the precipitation will contact the various sensors in the first and second rows of sensors 605, 606. Specifically during snowfall the snow will accumulate to a predetermined initial accumulation level such that the snow is contacting both the bottom-most sensor 605A of the first row of sensors 605 and the bottom-most sensor 606A of the second row of sensors 606. Upon this predetermined initial accumulation level being reached, the first signal will be generated by the precipitation sensing module 602 and transmitted to the control module 530. Furthermore, upon receipt of the first signal, the control module 530 will activate the autonomous robot apparatus 100 to perform the first instance of the work routine as has been discussed in detail above.

As the snow continues to accumulate, additional signals will be transmitted from the precipitation sensing module 602 to the control module 530. Thus, as the accumulation level reaches a predetermined secondary accumulation level, the snow or other precipitant will be in contact with each of the second vertical sensor 605B of the first row of sensors 605 and the second vertical sensor 606B of the second row of sensors 606. As this secondary accumulation level is reached, the precipitation sensing module 602 will generate and transmit a second signal to the control module 530. Upon receipt of the second signal, the control module 530 will cause the autonomous robot to perform a second instance of the work routine in any one of the manners as discussed above. This process continues as the precipitation (i.e., snow) falls to achieve third, fourth, fifth, etc. accumulation levels and contacts additional pairs of sensors of the first and second rows of sensors 605, 606. Furthermore, as discussed, above with regard to the precipitation sensing module 502. the precipitation sensing module 602 may include only a single vertical row of sensors, and another sensor to close the circuit may be located on the ground or elsewhere such that as the snow accumulates to contact sensors that are vertically higher on the base 603, additional signals will be transmitted from the precipitation sensing module 602 to the control module 530.

Figure 3:
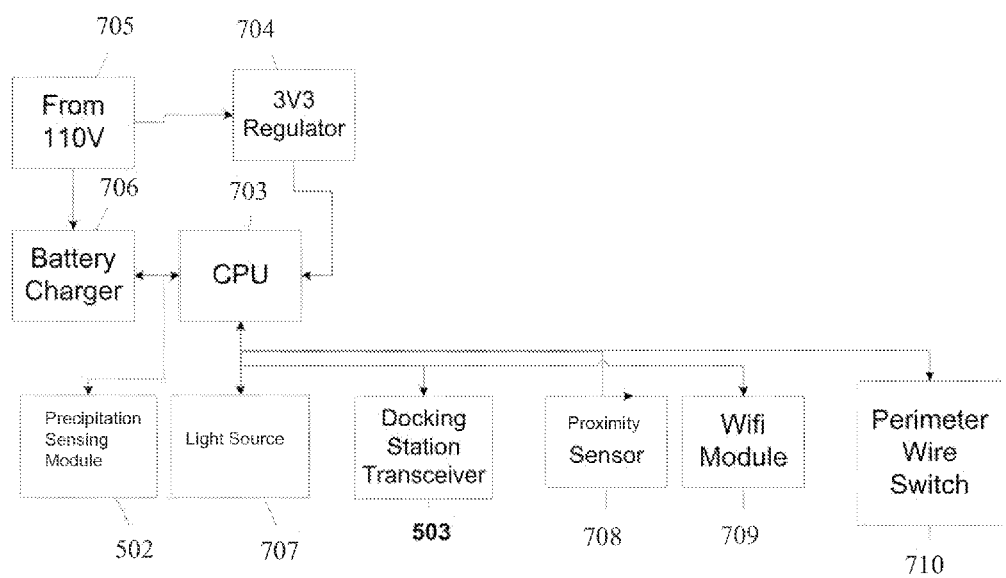
FIG. 3 is a schematic of the components of a docking station in accordance with an embodiment of the present invention.
Figure 7:
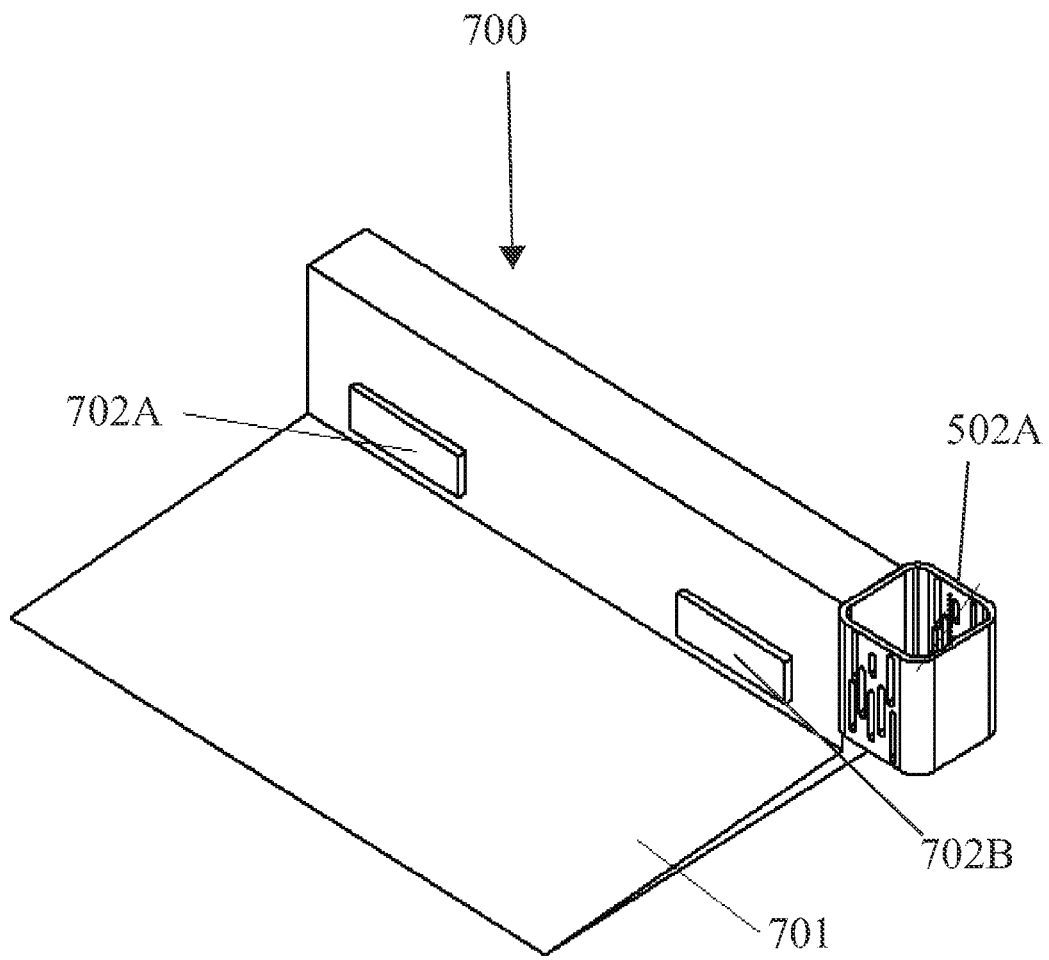
FIG. 7 is a perspective view of the accumulation level sensor of FIG. 5A operably coupled to a docking station.

Referring now to FIGS. 3 and 7 concurrently, a docking station 700 of the autonomous robot apparatus 100 will be described in accordance with one embodiment of the present invention. In the exemplified embodiment, the docking station 700 comprises a ramp 701, electrical contacts 702A, 702B and the precipitation sensing module 502A. Although the precipitation sensing module 502A is exemplified as being coupled to and/or forming a part of the docking station 700, the invention is not to be so limited and in certain other embodiments the precipitation sensing module 502A may be located adjacent to the docking station 700, the precipitation sensing module 502A may be positioned on the chassis 101 of the autonomous robot 199, or the precipitation sensing module 502A may be positioned separately from each of the docking station 700 and the autonomous robot 199, but may be in operable communication with one or both of the docking station 700 and the autonomous robot 199.

The autonomous robot 199 may dock at the docking station 700 so that the power source 521 of the autonomous robot system 100 may be recharged as desired or needed. Furthermore, although in the exemplified embodiment the docking station 700 is depicted as being an open structure, in other embodiments the docking station 700 may comprise a housing within which the autonomous robot 199 may be housed for protection against the elements. In such embodiments the docking station 700 may include a heater to maintain the autonomous robot 199 at a desired temperature to prevent the autonomous robot 199 from freezing.

When desired, the autonomous robot 199 may maneuver itself to the docking station 700 and ride up the ramp 701 of the docking station 700 to position electrical contacts (not illustrated) of the autonomous robot 199 into contact with the electrical contacts 702A, 702B. Contact between the electrical contacts of the autonomous robot 199 and the electrical contacts 702A, 702B will facilitate charging of the power source 521. In certain embodiments, the autonomous robot 199 may run out of power during a work routine. In such embodiments the autonomous robot 199 may maneuver itself over to the docking station 700 for charging, and will then continue the work routine from where it left off upon obtaining a sufficient charge.

In the exemplified embodiment, the precipitation sensing module 502A is mounted to the docking station 700. Furthermore, the docking station 700 comprises a central processing unit (CPU) 703 that is operably coupled to a power source 705, a 3V3 regulator 704, and a battery charger 706. The CPU 703 is also operably coupled to the precipitation sensing module 502 (which can be the precipitation sensing module 502A, the precipitation sensing module 602, or any other type of device used for sensing precipitation and/or detecting the accumulation of precipitation). Furthermore, the CPU 703 may be operably coupled to a light source 707, such as LED lights, the docking station transceiver 503, a proximity sensor 708, a WiFi module 709 and a perimeter wire switch 710.

The collection of the power source 705, the 3V3 regulator 704 and the battery charger 706 facilitates charging of the autonomous robot 199 as discussed above when desired. The light source 707 illuminates the area surrounding the docking station 700 for safety and security. The proximity sensor 708, which in some embodiments may be a passive infrared sensor (PIR), determines whether there is an undesirable object, such as a human being, in the surrounding area. Specifically, the proximity/PIR sensor 708, in one embodiment, measures motion by measuring the infrared levels of the surrounding objects. Alternatively, the proximity/PIR sensor 708 may measure capacitance levels of nearby objects and compare them to a baseline level. The proximity/PIR sensor 708 is used as a safety sensor and instructs the CPU 703 to transmit a signal via the docking station transmitter 503 that shuts down the autonomous robot 199 as will be discussed in more detail below with reference to FIG. 9. Furthermore, the perimeter wire switch 710, which is operably coupled to the CPU 703, transmits a signal to activate the perimeter wire when such is desired.

The WiFi module 709 is operably coupled to the CPU 703 using USART communication protocol. The WiFi module 709 allows the CPU 703 to connect to the Internet. For example, it may be desirable for the CPU 703 to have access to weather data based on the current location of the autonomous robot 199. Thus, the docking station 700 may be able to access the Internet via the WiFi module 709 to determine the current and future weather in the region. In some embodiments, the autonomous robot apparatus 100 may only detect for snow accumulation when the weather data indicates that there is a chance of snow, and the autonomous robot apparatus 100 will not make any efforts at detecting accumulation when the weather data indicates that no snow or precipitation will occur in the area in which the autonomous robot apparatus 100 is positioned. This will be discussed in more detail below with reference to FIG. 11.

In the embodiment exemplified in FIGS. 3 and 7, as noted above the precipitation sensing module 502A is mounted on the docking station 700, and is in operable communication with the CPU 703. In this embodiment, upon the accumulation level sensor of the sensing module 502A detecting the predetermined initial accumulation level being achieved, the CPU 703 will cause the docking station transceiver 503 to transmit the first signal to the control module 530 of the autonomous robot apparatus 100. Then, upon receipt of the first signal, the control module 530 will activate the autonomous robot apparatus 100 to perform the first instance of the work routine, as has been discussed in detail above.

Figure 8:
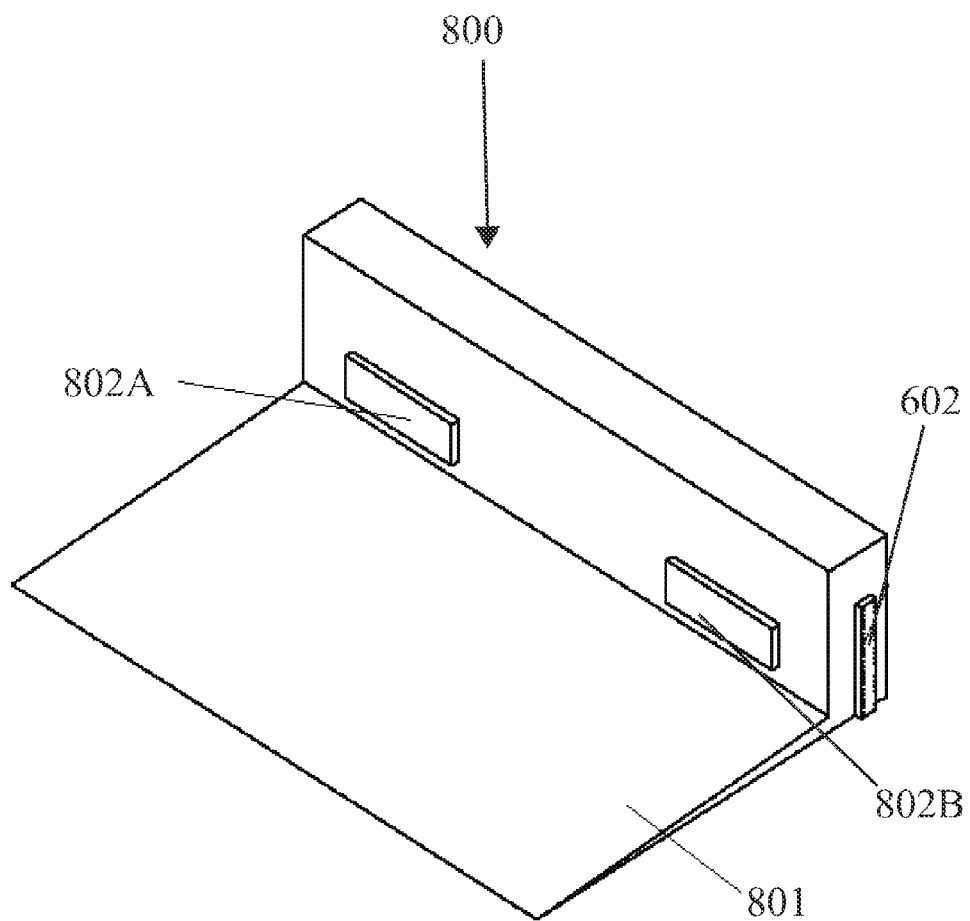
FIG. 8 is a perspective view of the accumulation level sensor of FIG. 6 operably coupled to the docking station/

Referring briefly to FIGS. 3 and 8 concurrently, another embodiment of a docking station 800 is illustrated. The docking station 800 is identical to the docking station 700 in many respects, and thus similar features will be similarly numbered except that the 800-series of numbers will be used. Certain features of the docking station 800 may be similarly numbered as the docking station 700 but might not be described in detail herein in the interest of brevity, it being understood that the discussion of the similar component on the docking station 700 applies. Furthermore, features of the docking station 700 described above that are not illustrated on the docking station 800 or that are illustrated on the docking station 800 but not numbered are applicable to the docking station 800 in certain embodiments and vice versa. Thus, various combinations of the description below with regard to the docking station 800 and the description above with regard to the docking station 700 are within the scope of the present invention in some embodiments.

In the exemplified embodiment, the docking station 800 comprises a ramp 801, electrical contacts 802A, 802B and the precipitation sensing module 602. Thus, the only difference between the docking station 800 and the docking station 700 is that the precipitation sensing module 602 is depicted mounted on the docking station 800 rather than the precipitation sensing module 502A. Although the precipitation sensing module 602 is exemplified as being coupled to and/or forming a part of the docking station 800, the invention is not to be so limited and in certain other embodiments the precipitation sensing module 602 may be located adjacent to the docking station 800, the precipitation sensing module 602 may be positioned on the chassis 101 of the autonomous robot 199, or the precipitation sensing module 602 may be positioned separately from each of the docking station 800 and the autonomous robot 199, but may be in operable communication with one or both of the docking station 800 and the autonomous robot 199. All other features and components described above with regard to the docking station 700 are applicable to the docking station 800.

Figure 11:
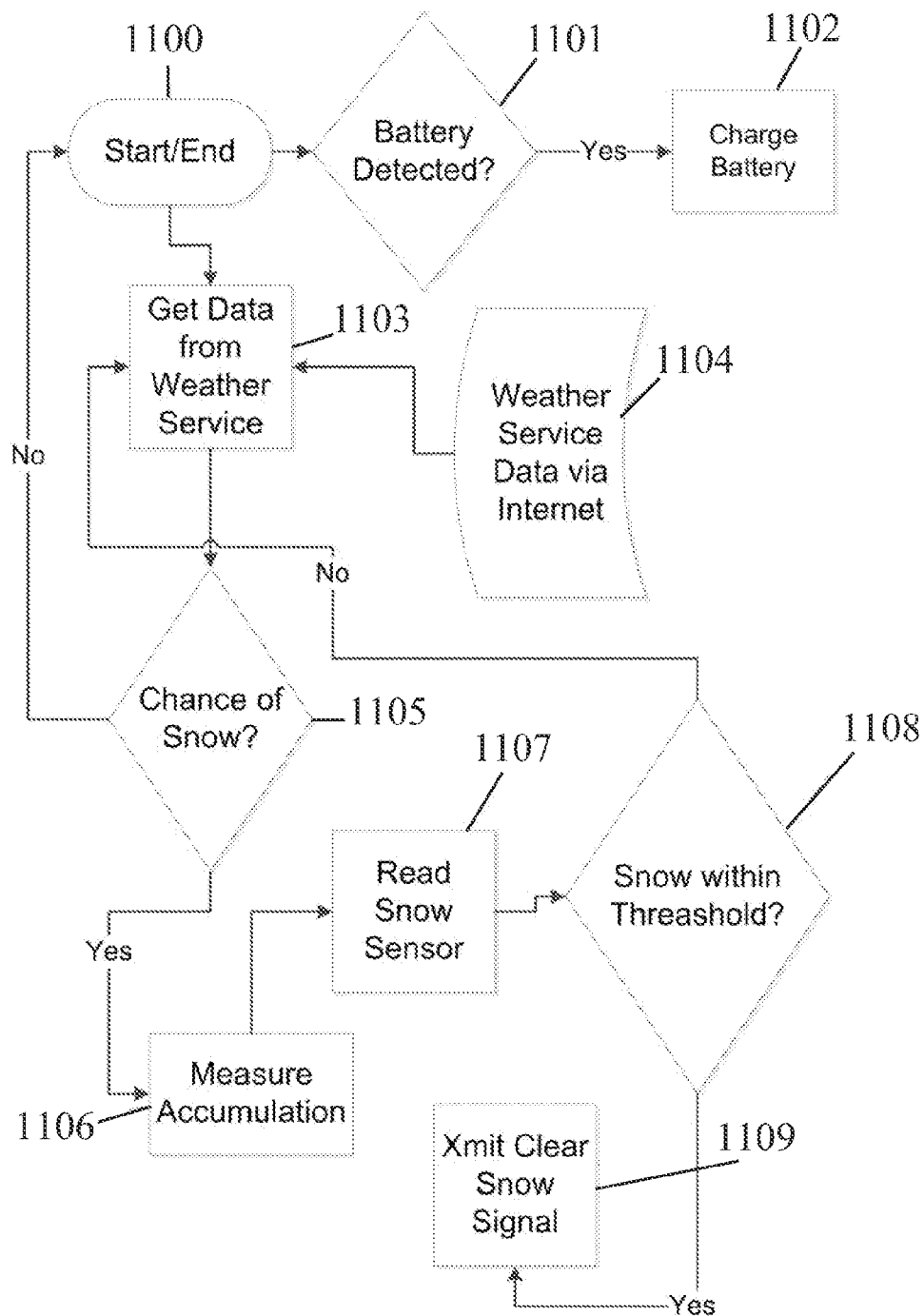
FIG. 11 is a flowchart of operation of the autonomous robot apparatus of FIG. 1 in accordance with another embodiment of the present invention.

Referring to FIG. 11, a flowchart is provided for operations that take place within the docking station 700, 800. The docking station 700, 800 program starts at step 1100. After starting, the docking station 700, 800 checks to see if the autonomous robot apparatus's 100 battery is connected to the charger, as indicated at step 1101. If the autonomous robot apparatus's 100 battery is connected to the charger, then the charge battery process will execute to charge the battery, as indicated at step 1102.

In one embodiment, the docking station program may access weather data based on the GPS location of the autonomous robot apparatus 100. In another embodiment, geolocation services can be used to obtain the address at which the autonomous robot apparatus 100 is intended to be used. This can be accomplished via an IP address by accessing a web service via the Internet or in other manners as desired.

As discussed above, the weather data, which is received in steps 1103 and 1104, can be obtained via the Internet or otherwise, such as via the WiFi module 709 of the docking station 700, 800. The docking station uses the weather data to determine whether there is a chance of snow or other precipitation, as indicated at step 1105. If the weather data indicates that there is no chance of snow/precipitation, the program ends and goes to step 1100. If the weather data indicates that there is a chance of snow/precipitation, the autonomous robot apparatus 100 will measure the accumulation using the precipitation sensing module 502, 502A, 602 as discussed above, as indicated at step 1105. In one embodiment of the operation the weather service data may allow the autonomous robot apparatus 100 to conserve energy until the weather service provides data that indicates snow fall in the snow blower robot's location is imminent. In such embodiments, upon learning that snow fall is imminent, the autonomous robot apparatus 100 may ping or poll the precipitation sensing module 502 to determine if an initial accumulation level of snow or other precipitant has been achieved.

The docking station and/or the autonomous robot apparatus 100 then reads the precipitation sensing module 502 or obtains signals from the precipitation sensing module 502 as discussed in detail above and as indicated at step 1107. If it is determined that the accumulation has reached an initial accumulation level, as indicated at step 1108, the first signal (or a later signal) will be transmitted to the control module 530, and the control module 530 will activate the autonomous robot apparatus 100 to perform the work routine, as indicated at step 1109.

Thus, in one embodiment the docking station 700, 800 plays an important role in the communication between the various components in order to activate the autonomous robot 100 to perform its work routine. For example, the docking station 700, 800 may be an intermediary in the communication link between the control module 530 and the precipitation sensing module 502. However, in other embodiments the components discussed above as being a part of the clocking station 700, 800 may instead form a part of the autonomous robot itself. For example, the autonomous robot itself may communicate via the Internet to determine the weather forecast in order to make a determination as to whether or not to await information/signals from the precipitation sensing module 502. Thus, different combinations of the components are possible whereby they may be positioned within the body of the robot itself, within the docking station, or elsewhere.

Although specific exemplified embodiments of the manner in which the autonomous robot apparatus 100 detects snow accumulation have been described above, the invention is not to be limited by those specific techniques in all embodiments. Specifically, in certain embodiments the autonomous robot apparatus 100 may include a light switch or photo detector that is operably coupled to the control module 530 for the detection of precipitation. Specifically, in this embodiment light moves through the air in the environment to the photo detector when there is no precipitation falling from the sky. When light moves through the air, the photo detector circuit is closed. The circuit is broken when snow (or any obstacle) disperses the light. When the circuit is broken, a signal may be transmitted to the control module 530 causing the control module 530 to instruct the autonomous robot apparatus 100 to perform the work routine. In certain such embodiments, LEDs or any other light source can be used in the photo detector.

Thus, in this embodiment, when snow is tailing the first signal is transmitted to the control module 530 to activate the autonomous robot, apparatus 100 to perform a first instance of the work routine. The autonomous robot apparatus 100 will complete the entire first instance of the work routine. Upon completion of the work routine, the autonomous robot 100 will determine if it is still snowing based on whether the circuit is broken due to precipitation dispersing the light. If it is still snowing, the autonomous robot apparatus 100 will automatically continue to perform a second instance of the work routine. This can continue until it is determined, based on information obtained from the photo detector as discussed above, that it is no longer snowing. The autonomous robot apparatus 100 may take breaks from performing the work routine for battery charging as needed in the manner discussed above.

In another embodiment, the camera 505 can be used to detect snowfall. Specifically, the camera 505 can repeatedly or at intervals take pictures of the environment and detect snow via color. Specifically, the camera 505 can analyze the bitmap data and look for the RGB values (of the RGB color model) that correspond to the range of white that snow may fall in. Similarly, the camera 505 may measure snow depth by analyzing the bitmap data and counting the number of vertical pixels that correspond to the color threshold that defines snow. In other embodiments, the camera 505 may measure the height of the snow using two or more cameras or a camera plus. Upon determining that snow has fallen, the camera 505 can transmit the signals to the control module 530, and the control module 530 will correspondingly instruct the autonomous robot apparatus 100 to perform the work routine.

In another embodiment, the autonomous robot apparatus 100 may include whiskers or some structure extending therefrom. The whiskers may extend from the side of the chassis 101 of the autonomous robot 199. As snow falls, the weight of the snow will cause the whisker to move, which will result in the signals being transmitted to the control module 530 as discussed above to activate the autonomous robot apparatus 100 to perform instances of the work routine as needed.

In yet another embodiment, the container 580A or some other type of cup-like or plate-like structure (including a flat plate in the shape of a conventional scale) may be used to collect the snow or other precipitant as it falls. In this embodiment, rather than measuring accumulation in height from the ground (or from the floor of the cup), accumulation may be measured based on weight of the precipitant. Thus, the precipitation sensing module may be configured to transmit the first signal to the control module 530 upon the accumulation attaining a first weight, and so on, which will result in the signals being transmitted to the control module 530 as discussed above to activate the autonomous robot apparatus 100 to perform instances of the work routine as needed.

Any one of the camera, the photo detector, the whiskers or the scale may be considered the accumulation level sensor in some embodiments. Using the camera, the initial accumulation level can be a specific depth of accumulation. Using the photo detector or the whiskers, the initial accumulation level can be the mere indication of falling snow. Using the scale, the initial accumulation level can be a specific weight of the accumulation.

Figure 4:
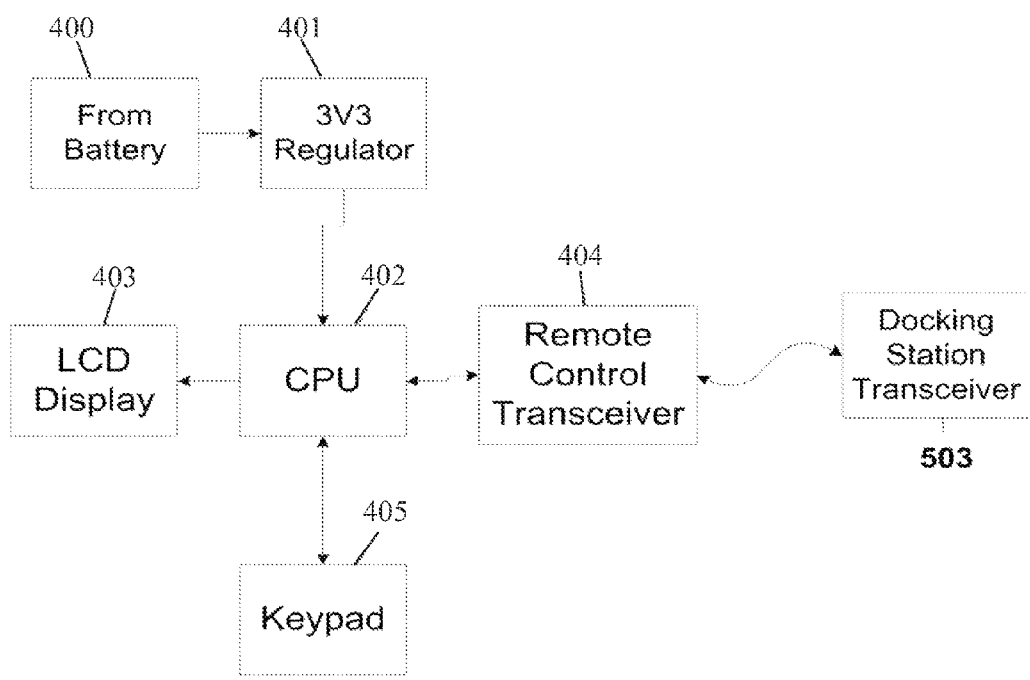
FIG. 4 is a schematic of the components of a remote controller in accordance with an embodiment of the present invention.

In one embodiment, the autonomous robot apparatus 100 may be controlled via a remote control. A schematic diagram of the components of such a remote control is provided in FIG. 4. Specifically, the remote control is powered by a battery 400 that supplies power to a 3V3 regulator 401. The 3V3 regulator provides power to all devices in the remote control. The remote control comprises a computer processing unit (CPU) 402 that is operably coupled to the 3V3 regulator 401, an LCD display 403, a keypad 405 and a remote control transceiver 404. Furthermore, the remote control transceiver 404, in the exemplified embodiment, is capable of communicating with the docking station transceiver 503. Although not illustrated, the remote control transceiver 404 may communicate directly with the transceiver 504 of the autonomous robot apparatus 100 in certain embodiments.

Thus, the remote control may be used to send signals to the autonomous robot to maneuver the autonomous robot. Furthermore, the remote control may be used to change the intervals of accumulation upon which the signals are transmitted from the precipitation sensing module to the control module. Specifically, the remote control can turn "off" some of the sensors to increase the accumulation intervals.

Figure 12:
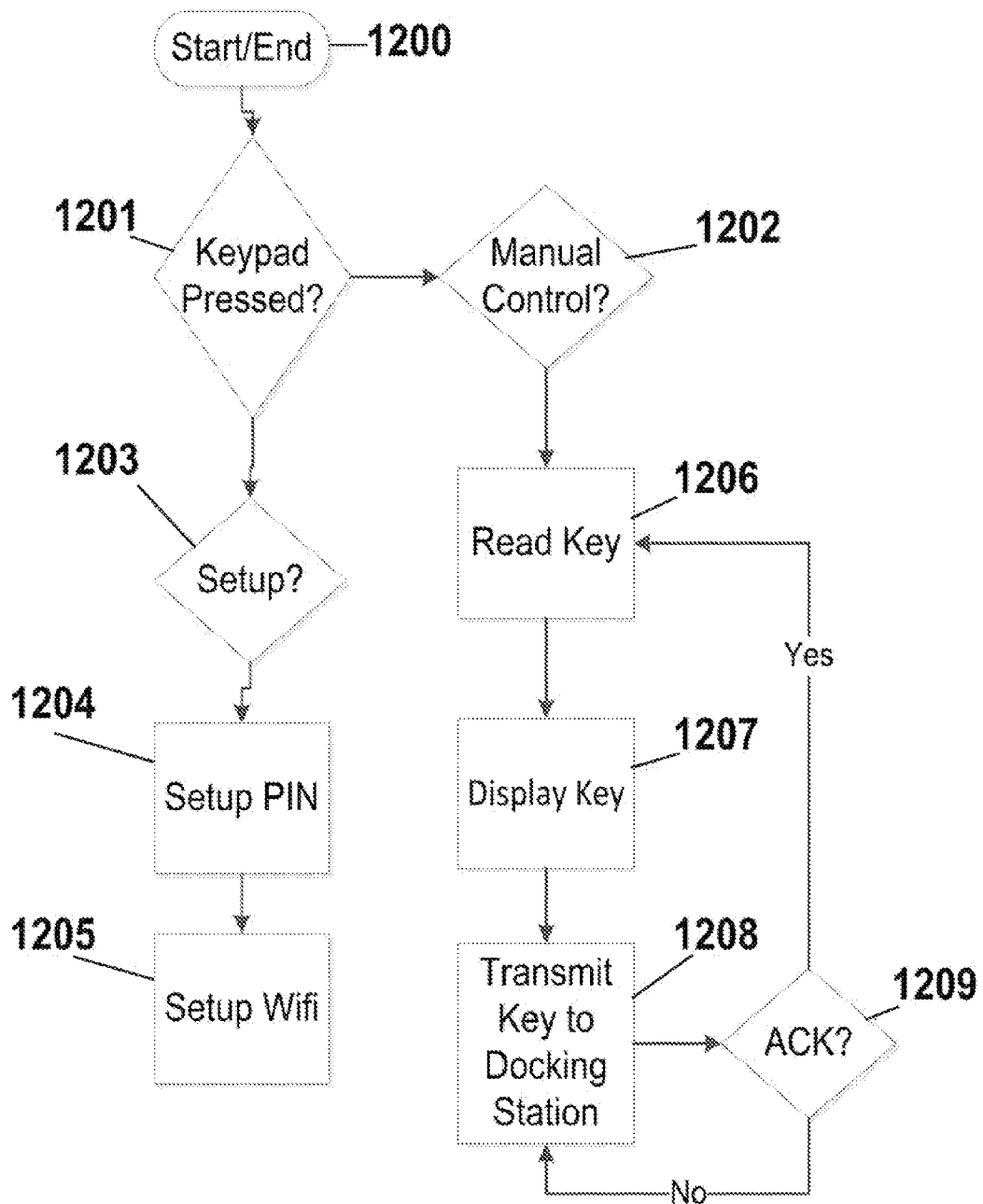
FIG. 12 is a flowchart of operation of the remote controller of FIG. 4 in accordance with one embodiment of the present invention.

Referring to FIG. 12, a flowchart illustrates the program for the remote control. The remote control program starts and ends at step 1200 and waits for the keypad to be pressed, indicated at step 1201. After the keypad has been pressed at step 1201, the program determines if the autonomous robot apparatus 100 has been setup, indicated at step 1203, or if the operator is only attempting to manually control the autonomous robot apparatus 100, indicated at step 1202.

If the autonomous robot apparatus 100 has not yet been setup then the setup personal identification number (PIN) process, indicated at step 1204, will prompt the user for a PIN code. Next, the remote control will prompt the user to setup the WiFi module information, indicated at step 1205. If the bounded area perimeter is defined as specified in one of U.S. Pat. No. 8,428,776 and U.S. Patent Application No. 2012/0265391, then the remote control setup function will also include a boundary setup function. If the remote control input on the keypad is for manual control, as indicated at step 1202, then the program will read the key that was pressed, indicated at step 1206, display that key on the LCD, indicated at step 1207, and transmit that key to the docking station, indicated at step 1208. The remote control will wait for the docking station to acknowledge receipt of the transmitted key, indicated at step 1209. If no acknowledgement of the signal is received by the remote control, then the remote control will timeout and display an error on the LCD.

Thus, the remote control may be used for manual operation and allows the end user to obtain manual control over the autonomous robot apparatus 100. The remote control functions include, for example without limitation, forward, reverse, left, right, snow-removal sub-system 550 powered on, snow-removal sub-system 550 powered off, emergency stop and setup. The remote control setup function allows the end user to configure the autonomous robot apparatus when to run. Some of the parameters of the autonomous robot apparatus 100 that can be modified with the remote control include schedule times (such as pre-scheduled times for the autonomous robot apparatus 100 to perform the work routine), snow accumulation (such as amounts of accumulation before the autonomous robot apparatus 100 is made to perform the work routine), and boundary or desired planned coverage path/coverage pattern.

Figure 9:
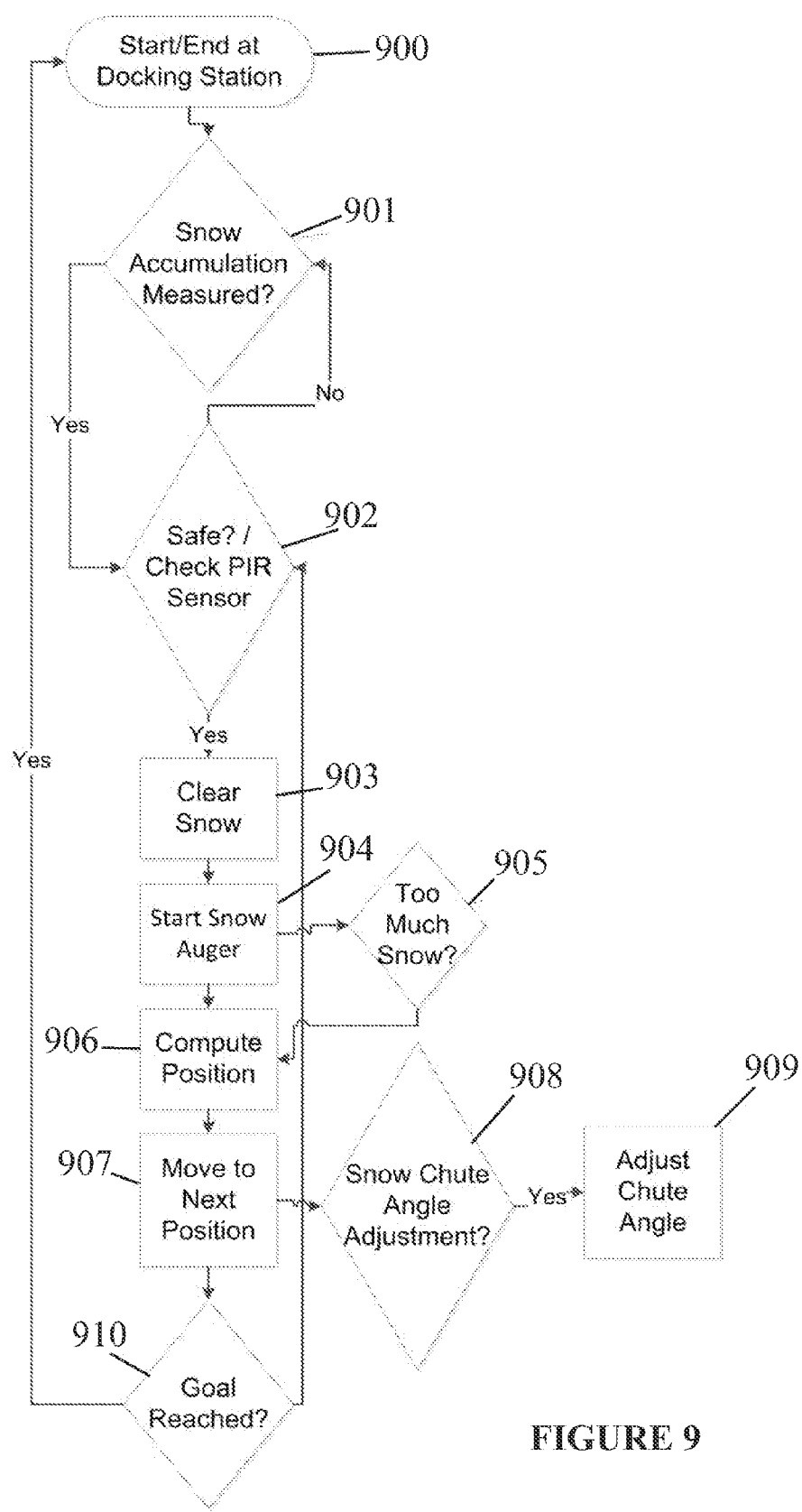
FIG. 9 is a flowchart of operation of the autonomous robot apparatus of FIG. 1 in accordance with one embodiment of the present invention.

Referring to FIG. 9, the operation of the autonomous robot apparatus 100 will be described in detail in accordance with one particular embodiment of the present invention. Before the autonomous robot apparatus 100 is set up for operation, the boundary of the work area must be defined, which can be accomplished in any of the manners discussed above. Specifically, the boundary of the work area can be defined using physical objects, such as landscaping rocks, man-made objects, vegetation, or any other physical means used to confine the autonomous robot apparatus 100 to the desired working area, placed along the perimeter of the bounded area. Alternatively, the boundary of the work area can be defined by marking the perimeter of the bounded area using an electrical wire, or multiple electrical wires, by beacons placed at specific locations along or near the perimeter of the bounded area such that the autonomous robot apparatus may determine a proximity to the boundary based on the wireless signals transmitted by the beacons, mathematically for which autonomous robot apparatus 100 computes its position with or without the help of external references (e.g. satellite navigation, beacons), using the perimeter wire sensor 522, or the like. In another embodiment, the boundary can be defined in the manner disclosed in any one of U.S. Pat. No. 8,428,776 and U.S. Patent Application No. 2012/0265391.

After the boundary of the work area has been defined, the autonomous robot apparatus 100 can be positioned at a desired location, preferably within the predefined boundary of the work area. In certain embodiments when not in use the autonomous robot apparatus 100 is positioned on the docking station 700, 800 for charging, protection or the like. However, the invention is not to be so limited in all embodiments and the autonomous robot apparatus 100 can be positioned at any desired location as it awaits instruction from the control module 530. Referring to FIG. 9, in the exemplified embodiment the start/end position, indicated at step 900, is the docking station 700, 800. After being positioned at the start/end position, the autonomous robot apparatus 100 waits to receive information that snow accumulation has been measured. Thus, at step 901, the autonomous robot apparatus 100 determines if snow accumulation has been measured at the predetermined initial accumulation level (by determining whether the control module 530 has received the first signal from the precipitation sensing module 502). If no snow accumulation has been measured or if the snow accumulation has not yet reached the predetermined initial accumulation level, the autonomous robot apparatus 100 continues to make the determination at step 901 until the answer is yes.

Upon snow accumulation being measured at step 901 at the predetermined initial accumulation level, the first signal will be transmitted to the control module 530 from the precipitation sensing module 502. In some embodiments, immediately upon receiving the first signal from the precipitation sensing module 502, the control module 530 will activate the autonomous robot apparatus 100 to perform the first instance of the work routine. However, in the exemplified embodiment, before the control module 530 causes the autonomous robot apparatus 100 to perform the first instance of the work routine, the autonomous robot apparatus 100, at step 902, obtains measurements from the proximity/PIR sensor 506 and/or the proximity/PIR sensor 708 to determine if movement has been detected in the area surrounding (i.e., within one foot, two feet, three feet, four feet, five feet, six feet, seven feet, eight feet, nine feet, ten feet or the like) the autonomous robot apparatus 100 or the docking station 700, 800. Alternatively, at step 902 the proximity/PIR sensor 506 and/or the proximity/PIR sensor 708 can determine if an undesired object, such as a human being, an animal or the like is in the surrounding area of the autonomous robot apparatus 100 or the docking station 700, 800 based on the detection of capacitance values relative to a threshold capacitance value. The proximity/PIR sensor 506 and/or the proximity/PIR sensor 708 is a safety feature that prohibits the autonomous robot apparatus 100 from starting operation of its work routine when an object that can potentially be banned by the autonomous robot apparatus 100 is in the surrounding area or nearby vicinity of the autonomous robot apparatus 100.

If the proximity/PIR sensor 506 and/or the proximity/PIR sensor 708 determines that an undesired object is present in the surrounding area of the autonomous robot apparatus 100, the proximity/PIR sensor 506 and/or the proximity/PIR sensor 708 generates and transmits a detection signal to the control module 530. Upon receipt of the detection signal, the control module 530 prohibits activation of the autonomous robot apparatus 100. Thus, if the answer at step 902 is that it is not safe to proceed, the process goes back to step 901 to determine if snow accumulation has been measured until it is determined that it is safe to proceed, which is determined when the proximity/PIR sensor 506 and/or the proximity/PIR sensor 708 is not transmitting a detection signal to the control module 530.

Thus, when the autonomous robot apparatus 100 is in a non-activated state (i.e., is not performing a work routine), the proximity/PIR sensor 506 and/or the proximity/PIR sensor 708 can prevent activation even if an initial accumulation level is detected. In other embodiments, the proximity/PIR sensor 506 and/or the proximity/PIR sensor 708 may be used as a kill switch that immediately terminates any snow clearing operations of the autonomous robot apparatus 100 by immediately shutting down every motor of the autonomous robot apparatus 100 so as to prevent injury to a person or animal upon the detection signal being received by the control module 530. In such embodiments, upon the detection signal no longer being received from the proximity/PIR sensor 506 and/or the proximity/PIR sensor 708, the autonomous robot apparatus 100 will resume work routine activities either from where it left off or by starting over the work routine start location, depending on the particular parameters of the control module 530 as discussed above.

If the answer at step 902 is "yes" that it is safe to proceed, this means that no detection signal has been transmitted to the control module 530 because there is no undesired object in the vicinity (i.e., surrounding area) of the autonomous robot apparatus 100. Thus, if the proximity/PIR sensor 506 and/or the proximity/PIR sensor 708 does not detect an undesired object in the surrounding area, the process continues to step 903. Specifically, if accumulation has been detected at step 901 and the proximity/PIR sensor 506 and/or the proximity/PIR sensor 708 does not detect an undesired object in the surrounding area, the control module 530 will cause the autonomous robot apparatus 100 to perform a first instance of the work routine as discussed above.

It should be appreciated that in some embodiments the proximity/PIR sensor 506 and/or the proximity/PIR sensor 708 is constantly monitoring the surrounding area to determine if an undesired object (i.e., a human, animal or the like) is located within the surrounding area of the autonomous robot apparatus 100. If at any time during a work routine the proximity/PIR sensor 506 and/or the proximity/PIR sensor 708 detects an undesired object in the surrounding area of the autonomous robot apparatus 100, the proximity/PIR sensor 506 and/or the proximity/PIR sensor 708 will transmit the detection signal to the control module 530 and the control module 530 will immediately shut down the autonomous robot apparatus 100. Thus, the autonomous robot apparatus 100 is extremely safe in that it will not operate if a person or animal is nearby. However, in certain other embodiments it should be appreciated that the proximity/PIR sensor 506 and/or the proximity/PIR sensor 708 may be omitted such that upon the initial accumulation level being detected, the control module 530 causes the autonomous robot apparatus 100 to begin the work session without first detecting for undesired objected in the vicinity of the autonomous robot apparatus 100.

Thus, at step 903 the control module 530 will activate the drive system 560 and the snow-removal sub-system 550. Starting the snow-removal sub-system 500 includes activating the auger 105 as indicated at step 904 to cause the auger 105 to begin revolving/rotating as discussed above. If the snow auger motor is operating within specifications then, at step 906, the autonomous robot apparatus 100 will utilize the compute position process to compute the next location for the autonomous robot apparatus 100 to move to via the move to next position, as indicated at step 907. If the load on the snow motor auger exceeds the design specification, then the compute position process of step 906 computes the next position to be reached at a slower speed and may also instruct the autonomous robot apparatus 100 to move in reverse.

Figure 10:
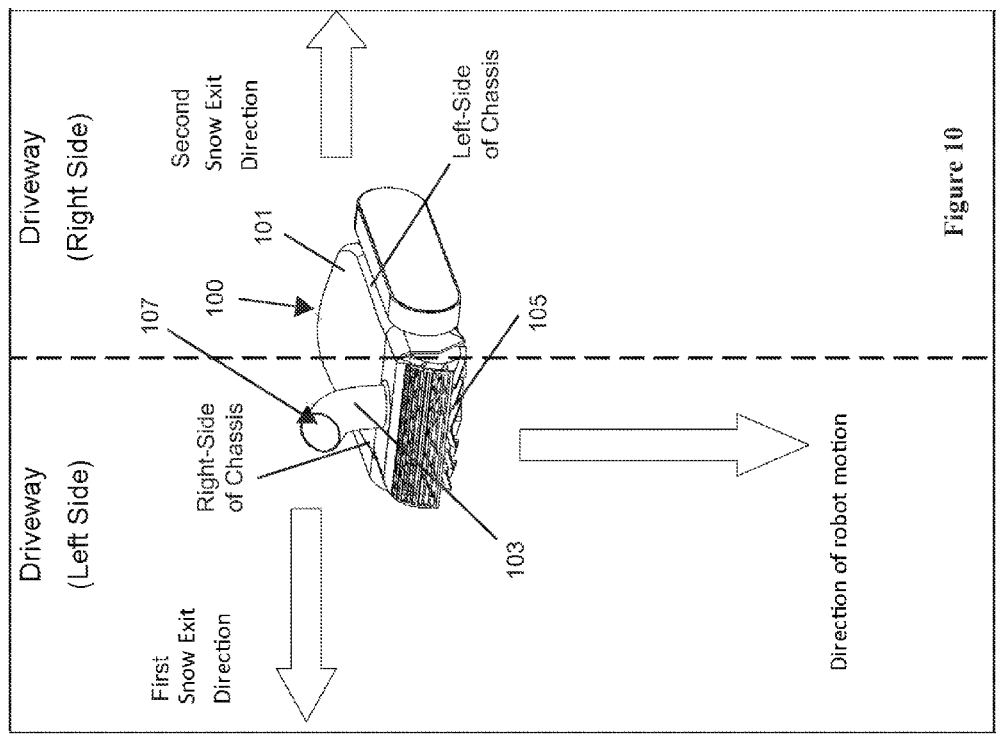
FIG. 10 is a schematic illustrating the operation of a directing device of a snow-removal sub-system of the autonomous robot of FIG. 1.

Referring briefly to FIGS. 9 and 10 concurrently, altering the directing device 103 of the autonomous robot apparatus 100 autonomously will be discussed. While the autonomous robot apparatus 100 is moving to the next position, as indicated at step 907, the position of the autonomous robot apparatus 100 is correlated to the angle of the directing device 103, as indicated at step 908. If the autonomous robot apparatus 100 has moved to a location that requires the directing device 103 to point in a new direction then the adjust chute angle process, indicated at step 909, will be called. The adjust chute angle process determines, based on the location of the robot relative to the edges of the area being cleared of snow (i.e., such as the grassy areas next to a driveway), whether the directing device 103 should be rotated or otherwise moved to change the direction at which the snow is being thrown/output. Specifically, if the adjust chute angle process of step 909 determines that based on the current positioning of the chassis 101 and of the directing device 103, the snow will be thrown to a location that is on the area that is being cleared (for example, the snow will be thrown but still remain, on the driveway), then the orientation of the directing device will be changed so that the snow is thrown to a location off of the area being cleared (i.e., onto the grassy areas next to the driveway). In certain embodiments, the adjust chute angle process of step 909 makes its determination based on the power of the exit chute and the distance that the snow is thrown relative to the location of the autonomous robot apparatus 100 in the bounded area to be cleared of snow. Changing the direction that the snow is thrown by rotating the location of the opening 107 of the directing device 103 can be achieved automatically utilizing the inventive autonomous robot apparatus 100. Specifically, the control module 530 can cause the directing device 103 to change positioning of the opening 107 based on the location of the autonomous robot apparatus 100 relative to the boundaries of the work area.

FIG. 10 is a schematic illustration of a driveway with the autonomous robot apparatus 100 thereon. The directing device 103 of the autonomous robot apparatus 100 is alterable between at least a first state in which the extracted snow is outputted in a first desired direction relative to the chassis 101 and a second state in which the extracted snow is outputted in a second desired direction relative to the chassis 101, the second direction being different than the first desired direction. Although two states are noted above, the directing device 103 may, in certain embodiments, be alterable between an unlimited number of states, each of which outputs the snow in a different direction relative to that of the other states. Specifically, in the exemplified embodiment the directing device 103 is rotatable 360° relative to the chassis 101, and the specific location of the output 107 of the directing device 103 relative to the chassis 101 also changes the direction that the snow will be output. Thus, in the exemplified embodiment the precipitant may be output in any direction/point within a 360° circle relative to the chassis 101.

Specifically, in the exemplified schematic, if the autonomous robot apparatus 100 is heading downwardly in the direction of the "direction of robot motion" arrow and the autonomous robot apparatus 100 is located within the left side of the driveway, the directing device 103 will be configured to output the snow in the direction of the "First Snow Exit Direction" arrow. If the autonomous robot apparatus 100 is heading upwardly in the direction opposite the direction of the robot motion arrow and the robot apparatus 100 is located within the left side of the driveway, the directing device 103 will still be configured to output the snow in the direction of the "First Snow-Exit Direction arrow." However, this will require that the directing device 103 be rotated 180° due to the change in the heading direction of the autonomous robot apparatus 100.

Thus, it should be appreciated that the directing device 103 is alterable between the first and second states, which includes altering the output direction of the snow relative to the chassis 101 of the autonomous robot apparatus 100. In that regard, the LOI module 540, which as discussed above is configured to determine the location and orientation of the chassis 101 of the autonomous robot apparatus 100, assists in this determination. Specifically, the LOI module 540 is operably coupled to the control module 530. Based on the information generated by the LOI module 540, the control module 530 is configured to select and switch between a desired one of the first state and the second state for the directing device.

Stated another way, when the autonomous robot apparatus 100 is located within the left side of the driveway and is heading downwardly, the LOI module 540 will transmit this location and orientation information to the control module 530, and the control module 530 will determine that it will be most effective to have the directing device 103 output the snow in a direction away from the right-side of the chassis 101. When the autonomous robot apparatus 100 is heading upwardly within the left side of the driveway, the LOI module 540 will transmit this information to the control module 530, and the control module will determine that it will be most effective to have the directing device 103 output the snow in a direction away from the left-side of the chassis 101. When the autonomous robot apparatus 100 is heading downwardly within the right side of the driveway, the LOI module 540 will transmit this information to the control module 530, and the control module 530 will determine that it will be most effective to have the directing device 103 output the snow in a direction away from the left-side of the chassis 101. When the autonomous robot apparatus 100 is heading upwardly within the right side of the driveway, the LOI module 540 will transmit this information to the control module 530, and the control module will determine that it will be most effective to have the directing device 103 output the snow in a direction away from the right-side of the chassis 101.

Changing the direction relative to the chassis 101 that the directing device 103 outputs the snow can be achieved, in the exemplified embodiment, by rotating the directing device 103 relative to the chassis 101. The directing device 103 is rotated or otherwise altered to change the output direction of the snow based on proximity to various boundaries of the area within which the work routine is to be performed. This ensures that the snow is output to a location external to the work area.

As discussed above, in the exemplified embodiment the directing device 103 is a single snow chute that can rotate relative to the chassis 101 so that the opening 107 can output the snow in a desired direction. In one alternative embodiment, the directing device 103 may include two or more separate snow chutes, each with a separate outlet opening for dispensing or outputting the snow. Each separate snow chute will have a closeable opening in communication with the auger. Thus, based on the desired output direction of the snow, one or more of the snow chute openings that are in communication with the auger can be closed to select the desired output direction of the snow that is extracted with the auger. Of course, other mechanisms for changing the output direction of snow (or other precipitant) that is extracted from the work area can be used.

Referring back to FIG. 9, the program will keep running until all of the points in the bounded area have been cleared of snow. The program goal indicated at step 910, is the last position that needs to be cleared. Once the goal is reached, the autonomous robot apparatus 100 returns to the docking station and waits for a new snow accumulation signal. As discussed above, the autonomous robot apparatus 100 is designed to clear the entire bounded area of snow on a single charge. In the case that the battery needs to be charged before the goal is reached then the autonomous robot apparatus 100 will return to the clocking station, wait until the battery is recharged, and begin snow clearing operations at the last cleared point (or from the starting point). Furthermore, if there is a new snow accumulation measurement taken while the autonomous robot apparatus 100 is being charged, the autonomous robot apparatus 100 may begin operations at the starting point or continue from the last cleared point.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present, disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An autonomous robot apparatus comprising:
    a chassis;
    a plurality of wheels mounted to the chassis;
    a drive system mounted to the chassis and operably coupled to the plurality of wheels;
    a control module operably coupled to the drive system;
    a precipitation sensing module comprising an accumulation cavity, wherein a floor of the accumulation cavity comprises at least one drainage aperture, an accumulation level sensor configured to generate and transmit, to the control module, a first signal upon a predetermined initial accumulation level of precipitation being detected, and wherein the predetermined initial accumulation level is an adjustable parameter that can be modified by an end user, wherein the accumulation level sensor comprises a plurality of sensors mounted on a wall of the accumulation cavity;
    the control module configured to activate the autonomous robot apparatus to perform a first instance of a work routine upon receipt of the first signal;
    the precipitation sensing module further configured to generate and transmit, to the control module, a second signal upon a predetermined secondary accumulation level of the precipitation being detected, the predetermined secondary accumulation level of the precipitation being a greater accumulation of the precipitation than the predetermined initial accumulation level of the precipitation;
    the control module further configured to cause the autonomous robot apparatus to perform a second instance of the work routine, after completion of the first instance of the work routine, upon receipt of the second signal.

2. The autonomous robot apparatus of claim 1 wherein the control module comprises a central processing unit and a memory device, the memory device storing instructions for the autonomous robot apparatus to perform the work routine.

3. The autonomous robot apparatus of claim 1 further comprising:
    a proximity sensor configured to detect presence of an undesired object and, upon detection of the undesired object, generate and transmit a detection signal to the control module; and
    wherein the control module is further configured to prohibit the activation of the autonomous robot apparatus if the detection signal is received.

4. The autonomous robot apparatus of claim 1 wherein the precipitation sensing module is coupled directly to the autonomous robot apparatus.

5. The autonomous robot apparatus of claim 1 further comprising a snow-removal sub-system mounted to the chassis, the snow-removal sub-system operably coupled to the control module, and wherein the snow-removal sub-system comprises a directing device configured to output extracted snow in a desired direction relative to the chassis.

6. The autonomous robot apparatus of claim 5 wherein the directing device is alterable between at least: (1) a first state in which the extracted snow is outputted in a first desired direction relative to the chassis; and (2) a second state in which the extracted snow is outputted in a second desired direction relative to the chassis, the second desired direction being different than the first desired direction.

7. The autonomous robot apparatus of claim 6 further comprising:
    a location and orientation identification (LOI) module configured to determine a location and orientation of the chassis relative to a boundary of a work area in which the work routine is being performed, the LOI module operably coupled to the control module;
    the control module further configured to select and switch between a desired one of the first state and the second state for the directing device based on the location and orientation of the chassis relative to the boundary of the work area to ensure that the extracted snow is output to a location external to the work area.

8. The autonomous robot apparatus of claim 1 further comprising:
a docking station; and
wherein the precipitation sensing module is mounted to the docking station, the accumulation level sensor level comprising the plurality of sensors mounted at different vertical heights.

9. The autonomous robot apparatus of claim 1 further comprising a heating sub-system mounted to the chassis, the heating sub-system configured to generate and direct thermal energy to a position below the chassis.

10. A method of controlling an autonomous robot comprising a chassis, a plurality of wheels mounted to the chassis, a drive system mounted to the chassis and operably coupled to the plurality of wheels, a control module operably coupled to the drive system, and a precipitation sensing module comprising an accumulation cavity, wherein a floor of the accumulation cavity comprises at least one drainage aperture, an accumulation level sensor configured to generate and transmit, to the control module, a first signal upon a predetermined initial accumulation level of precipitation being detected, and wherein the predetermined initial accumulation level is an adjustable parameter that can be modified by an end user, wherein the accumulation level sensor comprises a plurality of sensors mounted on a wall of the accumulation cavity, the method comprising:
a) detecting, with the accumulation level sensor, precipitation accumulation levels;
b) upon the predetermined initial accumulation level being detected by the accumulation level sensor, generating and transmitting to the control module the first signal;
c) upon the control module receiving the first signal, activating the autonomous robot to perform a first instance of a work routine;
d) continuing to detect precipitation accumulation levels while the autonomous robot is performing the first instance of the work routine;
e) upon a predetermined secondary accumulation level that is a greater level of precipitation than the predetermined initial accumulation level being detected by the accumulation level sensor, generating and transmitting to the control module a second signal; and
f) upon the control module receiving the second signal, activating the autonomous robot to perform a second instance of the work routine.

11. The method of claim 10 wherein step b) further comprises wirelessly transmitting the first signal to the control module from the precipitation sensing module that comprises the accumulation level sensor.

12. The method of claim 11 wherein the precipitation sensing module is mounted to a docking station.

13. The method of claim 11 wherein the precipitation sensing module is coupled directly to the autonomous robot.

14. The method of claim 10 wherein if the second signal is received by the control module prior to completion of the first instance of the work routine, the control module logs instruction to perform the second instance of the work routine subsequent to completion of the first instance of the work routine.

15. The method of claim 10 wherein the autonomous robot further comprises a proximity sensor configured to detect presence of an undesired object adjacent the chassis, and wherein step c) further comprises prohibiting activation of the autonomous robot if a detection signal is received from the proximity sensor.

16. The method of claim 15 wherein step c) further comprises resuming activation of the autonomous robot upon the detection signal not being received from the proximity sensor.

17. The method of claim 10 wherein the autonomous robot comprises a snow-removal sub-system mounted to the chassis, the snow-removal sub-system operably coupled to the control module, a location and orientation identification (LOI) module configured to determine a location and orientation of the chassis, the LOI module operably coupled to the control module, the method further comprising:
the LOI module transmitting to the control module information indicative of the chassis' location and orientation relative to a boundary of a work area in which the work routine is being performed; and
the control module selecting and switching between a desired one of a first state and a second state for a directing device of the snow-removal sub-system based on the location and orientation of the chassis relative to the boundary of the work area to ensure that the extracted snow is output to a location external to the work area, wherein in the first state, the extracted snow is outputted in a first desired direction relative to the chassis and wherein in the second state the extracted snow is outputted in a second desired direction relative to the chassis, the second desired direction being different than the first desired direction.

* * * * *